United States Patent
Ueno et al.

(10) Patent No.: US 12,435,652 B2
(45) Date of Patent: Oct. 7, 2025

(54) EXHAUST GAS PURIFICATION CONTROL DEVICE

(71) Applicant: DENSO CORPORATION, Kariya (JP)

(72) Inventors: Tomohiro Ueno, Kariya (JP); Eiji Takemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/411,387

(22) Filed: Jan. 12, 2024

(65) Prior Publication Data

US 2024/0240579 A1    Jul. 18, 2024

(30) Foreign Application Priority Data

Jan. 16, 2023  (JP) ................................ 2023-004725

(51) Int. Cl.
*F01N 3/20* (2006.01)
*F01N 11/00* (2006.01)
*F01N 13/00* (2010.01)

(52) U.S. Cl.
CPC ............ *F01N 3/2066* (2013.01); *F01N 11/00* (2013.01); *F01N 13/009* (2014.06); *F01N 13/011* (2014.06); *F01N 2550/05* (2013.01); *F01N 2610/02* (2013.01); *F01N 2610/144* (2013.01); *F01N 2610/1453* (2013.01); *F01N 2900/0414* (2013.01); *F01N 2900/0418* (2013.01); *F01N 2900/1806* (2013.01); *F01N 2900/1808* (2013.01)

(58) Field of Classification Search
CPC .... F01N 3/2066; F01N 11/00; F01N 2610/02; F01N 2900/1806
See application file for complete search history.

(56) References Cited

U.S. PATENT DOCUMENTS

| | | | |
|---|---|---|---|
| 8,387,366 B2 * | 3/2013 | Ohno | F01N 3/2066 60/281 |
| 2008/0087009 A1 * | 4/2008 | Nishina | F02D 41/1462 422/107 |

FOREIGN PATENT DOCUMENTS

| | | | |
|---|---|---|---|
| DE | 102009029408 A1 | 3/2011 | |
| DE | 102020201919 A1 | 8/2021 | |
| JP | 2017078345 A * | 4/2017 | F01N 11/00 |

OTHER PUBLICATIONS

Machine Translation of JP 2017078345 A (Year: 2017).*

* cited by examiner

*Primary Examiner* — Brandon D Lee
(74) *Attorney, Agent, or Firm* — Nixon & Vanderhye P.C.

(57) ABSTRACT

The exhaust gas purification controller is applied to a system with a catalyst and a supply valve for urea water. The exhaust gas purification controller performs an abnormality diagnosis of the supply valve, and includes a urea water filling portion, a valve opening command portion and an abnormality determiner. The urea water filling portion drives the pump at a start of operation of the exhaust gas purification system to start filling the supply passage with the urea water. The valve opening command portion outputs a valve opening command when a urea water pressure in the supply passage exceeds a predetermined valve opening pressure after filling the supply passage is started. The abnormality determiner determines presence or absence of a sticking abnormality of the supply valve based on the urea water pressure after the output of the valve opening command.

12 Claims, 14 Drawing Sheets

EXHAUST GAS PURIFICATION CONTROL DEVICE

CROSS REFERENCE TO RELATED APPLICATION

This application is based on and claims the benefits of priority of Japanese Patent Application No. 2023-004725 filed on Jan. 16, 2023. The entire disclosure of which is incorporated herein by reference.

TECHNICAL FIELD

The present disclosure relates to an exhaust gas purification control device.

BACKGROUND

An exhaust gas purification system has been known in which a selective reduction catalyst is provided in an exhaust passage.

SUMMARY

According to at least one embodiment, an exhaust gas purification controller is applied to an exhaust gas purification system including a catalyst of a selective reduction type provided in an exhaust passage of an internal combustion engine, a supply valve provided to supply urea water to an upstream part of the catalyst in the exhaust passage, and a pump for pumping the urea water to a supply passage connecting a urea water tank for storing the urea water with the supply valve. The exhaust gas purification controller is for performing an abnormality diagnosis of the supply valve. The exhaust gas purification controller includes a urea water filling portion, a valve opening command portion and an abnormality determiner. The urea water filling portion drives the pump at a start of operation of the exhaust gas purification system to start filling the supply passage with the urea water. The valve opening command portion outputs a valve opening command for opening the supply valve when a urea water pressure in the supply passage exceeds a predetermined valve opening pressure after filling the supply passage with the urea water is started. The abnormality determiner determines presence or absence of a sticking abnormality of the supply valve based on the urea water pressure after the output of the valve opening command.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
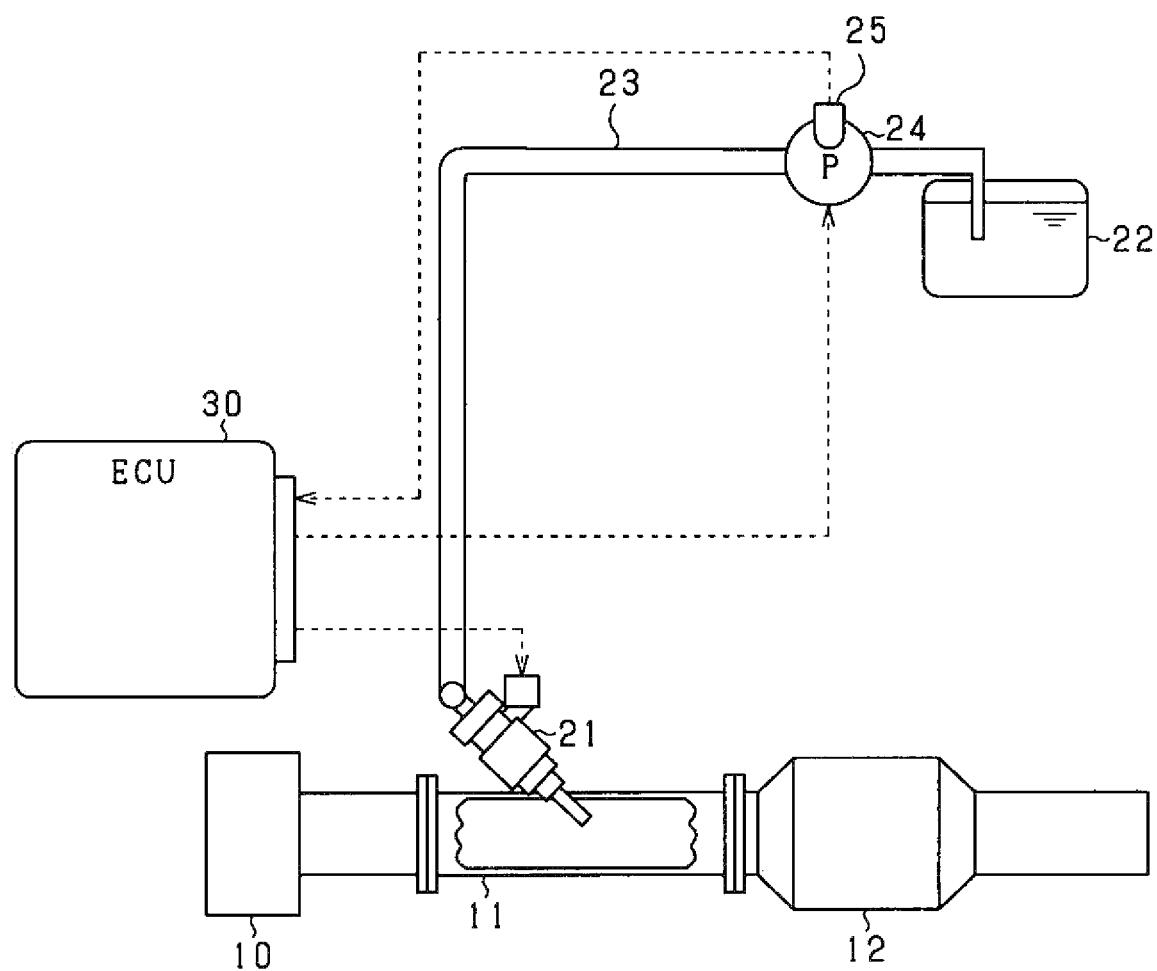
FIG. 1 is a schematic diagram illustrating an exhaust gas purification system according to a first embodiment.

To begin with, examples of relevant techniques will be described.

An exhaust gas purification system according to a comparative example including a selective reduction catalyst provided in an exhaust passage, and urea water is supplied to the exhaust passage from a supply valve provided upstream of the selective reduction catalyst, thereby purifying NOx discharged from an internal combustion engine.

In the supply valve with a valve body, a sticking abnormality may occur in which the valve body is stuck at a valve closing position or a valve opening position due to the urea water in the supply valve. The comparative example determines the presence or absence of a sticking abnormality in a supply valve based on a pressure in a supply passage when a pump draws urea water.

In a determination of a sticking abnormality of a supply valve, determination accuracy of the sticking abnormality is improved as a difference in a pressure change in the supply passage between a normal state of the supply valve and the sticking abnormality of the supply valve is larger. Therefore, the pressure difference in the supply passage between the normal state of the supply valve and the sticking abnormality state may be increased to improve the accuracy of abnormality determination.

In contrast to the comparative example, according to an exhaust gas purification control device, determination accuracy of a sticking abnormality of a supply valve can be improved.

According to one aspect of the present disclosure, an exhaust gas purification controller is applied to an exhaust gas purification system including a catalyst of a selective reduction type provided in an exhaust passage of an internal combustion engine, a supply valve provided to supply urea water to an upstream part of the catalyst in the exhaust passage, and a pump for pumping the urea water to a supply passage connecting a urea water tank for storing the urea water with the supply valve. The exhaust gas purification controller is for performing an abnormality diagnosis of the supply valve. The exhaust gas purification controller includes a urea water filling portion, a valve opening command portion and an abnormality determiner. The urea water filling portion drives the pump at a start of operation of the exhaust gas purification system to start filling the supply passage with the urea water. The valve opening command portion outputs a valve opening command for opening the supply valve when a urea water pressure in the supply passage exceeds a predetermined valve opening pressure after filling the supply passage with the urea water is started. The abnormality determiner determines presence or absence of a sticking abnormality of the supply valve based on the urea water pressure after the output of the valve opening command.

According to this configuration, in the exhaust gas purification system including the catalyst of the selective reduction type and the supply valve for supplying the urea water, in a case where abnormality diagnosis of the supply valve is performed, it is conceivable that, at a time of starting operation of the exhaust gas purification system, the supply valve is brought into a urea water filling state by the pump driving, and the presence or absence of the sticking abnormality of the supply valve is determined based on a change in a urea water pressure caused by opening of the supply valve. However, in this case, in the configuration in which the supply valve is opened at the start of the filling of the urea water by the pump driving and the sticking abnormality of the supply valve is determined based on the change in the urea water pressure thereafter, there is a concern that accuracy of the sticking determination may be lowered due to the air present in the supply passage. That is, when the supply valve is opened from the start of the driving of the pump, the urea water pressure gradually increases while the air in the supply passage is gradually released along with the driving of the pump from the start of the opening of the supply valve. In addition, when the supply valve is in the sticking abnormality (when the valve is closed abnormally), the urea water pressure gradually increases due to compression of the residual air in a state where the air discharge does not occur. In this case, there is a concern that a difference in pressure change between the normal state of the supply valve and the sticking abnormality state of the supply valve becomes small, and the accuracy of the sticking determination of the supply valve decreases.

Regarding this, in the present invention, at the start of the operation of the exhaust gas purification system, after the filling of the urea water into the supply passage by the pump driving is started, and when the urea water pressure in the supply passage exceeds a predetermined valve opening pressure, the valve opening command for the supply valve is output, and the presence or absence of the sticking abnormality of the supply valve is determined based on the urea water pressure after the output of the valve opening command. In this case, after the start of the filling of the urea water by the pump driving, the valve opening command for the supply valve is output after the urea water pressure exceeds the valve opening pressure. Therefore, when the supply valve is in the normal state, a large amount of air in a compressed state is released at once in response to the output of the valve opening command, and an increase change in the urea water pressure is temporarily reduced. On the other hand, when the sticking abnormality of the supply valve occurs, the pressure changes substantially constantly before and after the valve opening command for the supply valve. In this way, by making the change in the urea water pressure different between the normal state and the sticking abnormality state of the supply valve, the sticking determination can be made appropriately based on the change in the urea water pressure. As a result, the determination accuracy of the sticking abnormality of the supply valve can be improved.

In the following, embodiments of the present disclosure will be described with reference to the drawings. In the present embodiment, an exhaust gas purification system for purifying exhaust gas of an internal combustion engine in a vehicle equipped with the internal combustion engine will be described. In the following embodiments, the same or equivalent parts will be denoted by the same reference numbers in the drawings, and explanation thereof in detail will be omitted.

First Embodiment

As shown in FIG. 1, in the exhaust gas purification system, an exhaust passage 11 is connected to an internal combustion engine 10, and a selective reduction catalyst 12 that purifies nitrogen oxides (NOx) in exhaust gas by using ammonia is provided in the exhaust passage 11. The internal combustion engine 10 is a diesel engine. However, the internal combustion engine 10 may be a gasoline engine. Although not shown, an oxidation catalyst having an oxidation function and a filter for collecting particulate matter in the exhaust gas may be provided upstream of the catalyst 12. An oxidation catalyst (ASC catalyst) for oxidizing ammonia passing through the catalyst 12 may be provided downstream of the catalyst 12.

In the exhaust passage 11, a supply valve 21 for supplying urea water into the exhaust passage 11 is provided upstream of the catalyst 12. The supply valve 21 is, for example, an electromagnetic valve of an electromagnetic drive type, and a valve body moves from a valve closing position to a valve opening position along with energization, and injects urea water.

The supply valve 21 supplies urea water, which is a precursor of ammonia, upstream of the catalyst 12 in the exhaust passage 11. The urea water supplied by the supply valve 21 is thermally decomposed and hydrolyzed by heat of the exhaust gas, and ammonia is generated. The ammonia flows into the catalyst 12 and is adsorbed thereon, so that a reduction reaction between the ammonia and NOx in the exhaust gas occurs and NOx is purified.

In addition, the exhaust gas purification system includes a urea water tank 22 that stores urea water, a supply passage 23 that communicates the supply valve 21 and the urea water tank 22, a pump 24 that pumps the urea water, and an ECU 30 as a controller that performs various controls.

The pump 24 is provided in the supply passage 23, and draws the urea water from the urea water tank 22 and pumps the urea water to the supply passage 23. The pump 24 is capable of forward rotation and reverse rotation, and pressure-feeds the urea water in the urea water tank 22 to the supply valve 21 by the forward rotation, and draws the urea water from the supply valve 21 by the reverse rotation. The pump 24 has a pressure sensor 25 that detects a pressure of the urea water in the supply passage 23. The pump 24 may be provided in the urea water tank 22.

The ECU 30 is an electronic control unit including a microcontroller having a calculation processing device (i.e., CPU), a read only memory (i.e., ROM), a random access memory (i.e., RAM), and the like. The ECU 30 performs various functions by executing programs stored in the ROM or the like. In the present embodiment, the ECU 30 corresponds to an exhaust gas purification control device. The various functions may be implemented by an electronic circuit that is hardware, or may be realized at least partially by software, that is, processing executed on a computer.

During an operation of the internal combustion engine 10, the ECU 30 controls the pump 24 to be driven in the forward rotation. As a result, the urea water is pressure-fed from the urea water tank 22 to the supply valve 21. Further, the ECU 30 controls the supply valve 21 to open to supply urea water to the upstream of the catalyst 12. After the operation of the internal combustion engine 10 is finished, the ECU 30 drives the pump 24 in the reverse rotation to collect the urea water in the supply passage 23 into the urea water tank 22. As a result, inconvenience such as freezing of the urea water in the supply passage 23 in the vehicle left state is reduced.

Further, in the supply valve 21, the valve body may be stuck at a closed position due to the urea water, and the supply valve 21 may be stuck closed. Therefore, in the present embodiment, the presence or absence of a sticking abnormality or a fixing abnormality of the supply valve 21 is determined based on a pressure change in the supply passage 23 under a forward rotation driving state of the pump 24 after power supply to the vehicle is turned on due to an ON operation of an IG switch or the like. The ECU 30 includes a urea water filling unit, a valve opening command unit, and a determination unit. The urea water filling unit drives the pump 24 at a start of operation of the exhaust gas purification system to start filling the supply passage 23 with urea water. The valve opening command unit outputs a valve opening command to open the supply valve 21 when the pressure in the supply passage 23 exceeds a predetermined valve opening pressure after filling the urea water into the supply passage 23 is started. The determination unit determines the presence or absence of the sticking abnormality of the supply valve 21 based on the pressure in the supply passage 23 after an output of the valve opening command.

Figure 2:
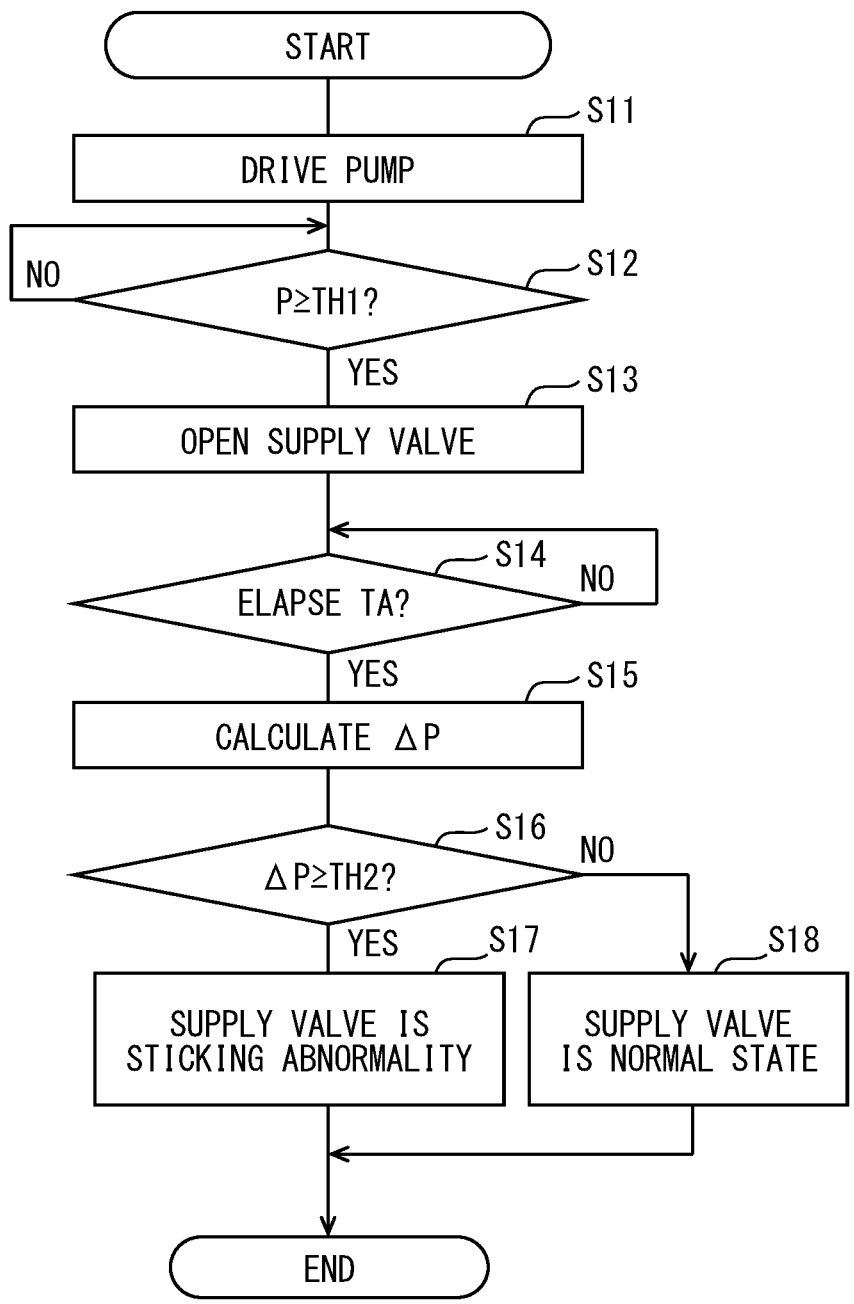
FIG. 2 is a flowchart illustrating an abnormality determination process of a supply valve.

FIG. 2 is a flowchart illustrating an abnormality determination process of the supply valve 21. This process is executed by the ECU 30 when the vehicle is powered on (when the exhaust gas purification system is activated). In the exhaust gas purification system, the supply valve 21 is in a closed state in an initial state at the start.

In FIG. 2, in step S11, the pump 24 starts to be driven to rotate in the forward direction, and in subsequent step S12, it is determined whether a urea water pressure P detected by the pressure sensor 25 is equal to or greater than a predetermined valve opening threshold TH1. In this case, after the start of the pump 24 in the forward direction, the urea water pressure P gradually increases, and when the urea water pressure P reaches the valve opening threshold TH1, an affirmative determination is made in step S12, and the process proceeds to step S13.

In step S13, the ECU 30 output a valve opening command for the supply valve 21. At this time, before the supply valve 21 is opened, air in the supply passage 23 is compressed by the pump drive, and the air in the supply passage 23 is discharged simultaneously with the opening of the supply valve 21.

Thereafter, in step S14, it is determined whether a predetermined period TA has elapsed after the output of the valve opening command for the supply valve 21, and when the result of step S14 is affirmative, the process proceeds to subsequent step S15. In step S15, an amount of increase in the urea water pressure P after the output of the valve opening command for the supply valve 21 is calculated as a pressure increase amount $\Delta P$, and in the following step S16, it is determined whether the pressure increase amount $\Delta P$ is equal to or greater than a diagnosis threshold TH2. Then, when the pressure increase amount $\Delta P$ is equal to or greater than the diagnosis threshold TH2, the process proceeds to step S17, and it is determined that the sticking abnormality occurs in the supply valve 21. When the pressure increase amount $\Delta P$ is less than the diagnosis threshold TH2, the process proceeds to step S18, and it is determined that the supply valve 21 is in a normal state.

Figure 3:
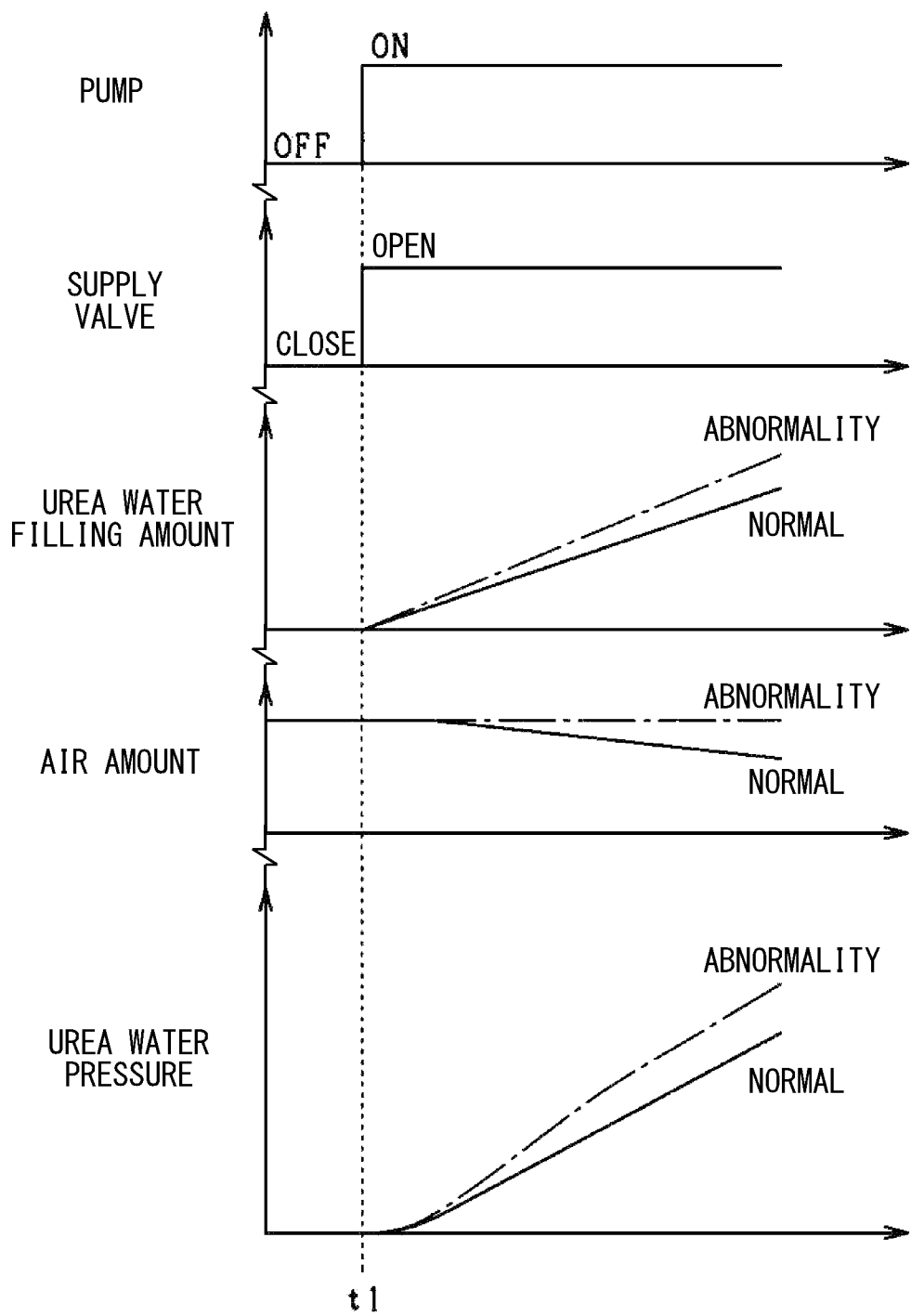
FIG. 3 is a time chart for explaining the abnormality determination process of the supply valve.

Next, the abnormality determination process of the supply valve 21 described above in FIG. 2 will be described more specifically with reference to a time chart. In the present embodiment, one of the features is that the supply valve 21 is not opened from the beginning of the pump driving in the driving state of the pump 24, but the supply valve 21 is opened after the urea water pressure rises to the valve opening threshold TH1 after the pump driving is started. As a comparative example, a pressure change in a case where the supply valve 21 is opened from the start of the pump driving will be described with reference to a time chart of FIG. 3. In FIG. 3, a parameter change in a case where the sticking abnormality does not occur in the supply valve 21, or in a case where the supply valve 21 is in the normal state, is indicated by a solid line, and the parameter change in the case where the sticking abnormality occurs is indicated by a dash-dot-dash line.

In FIG. 3, at timing t1, the pump 24 starts to be driven to rotate in the forward direction, and the supply valve 21 is opened in response to the valve opening command. As a result, after timing t1, a filling amount of the urea water in the supply passage 23 gradually increases, and an air amount in the supply passage 23 gradually decreases as indicated by the solid line in FIG. 3. In this case, the urea water pressure increases as the urea water is pumped by the pump.

The amount of air in the supply passage 23 does not decrease and becomes constant after timing t1 as indicated by the dash-dot-dash line in FIG. 3 when the sticking abnormality occurs in the supply valve 21. In addition, the urea water pressure increases in a state where there is no air release. In this case, a difference between the change in the urea water filling amount and the change in the urea water pressure is small in comparison between the normal state of the supply valve 21 and the sticking abnormality state. That is, when the supply valve 21 is in the normal state, the urea water filling amount gradually increases as the pump is driven, and the urea water pressure gradually increases while the air in the supply passage 23 is gradually discharged. On the other hand, when the supply valve 21 is in the sticking abnormality state, the urea water pressure gradually increases with the compression of residual air in a state where there is no air discharge. Therefore, the difference in the urea water pressure is small between the normal state and the sticking abnormality state of the supply valve 21, and it is difficult to determine the presence or absence of the sticking abnormality of the supply valve 21 based on the change in the urea water pressure.

Figure 4:
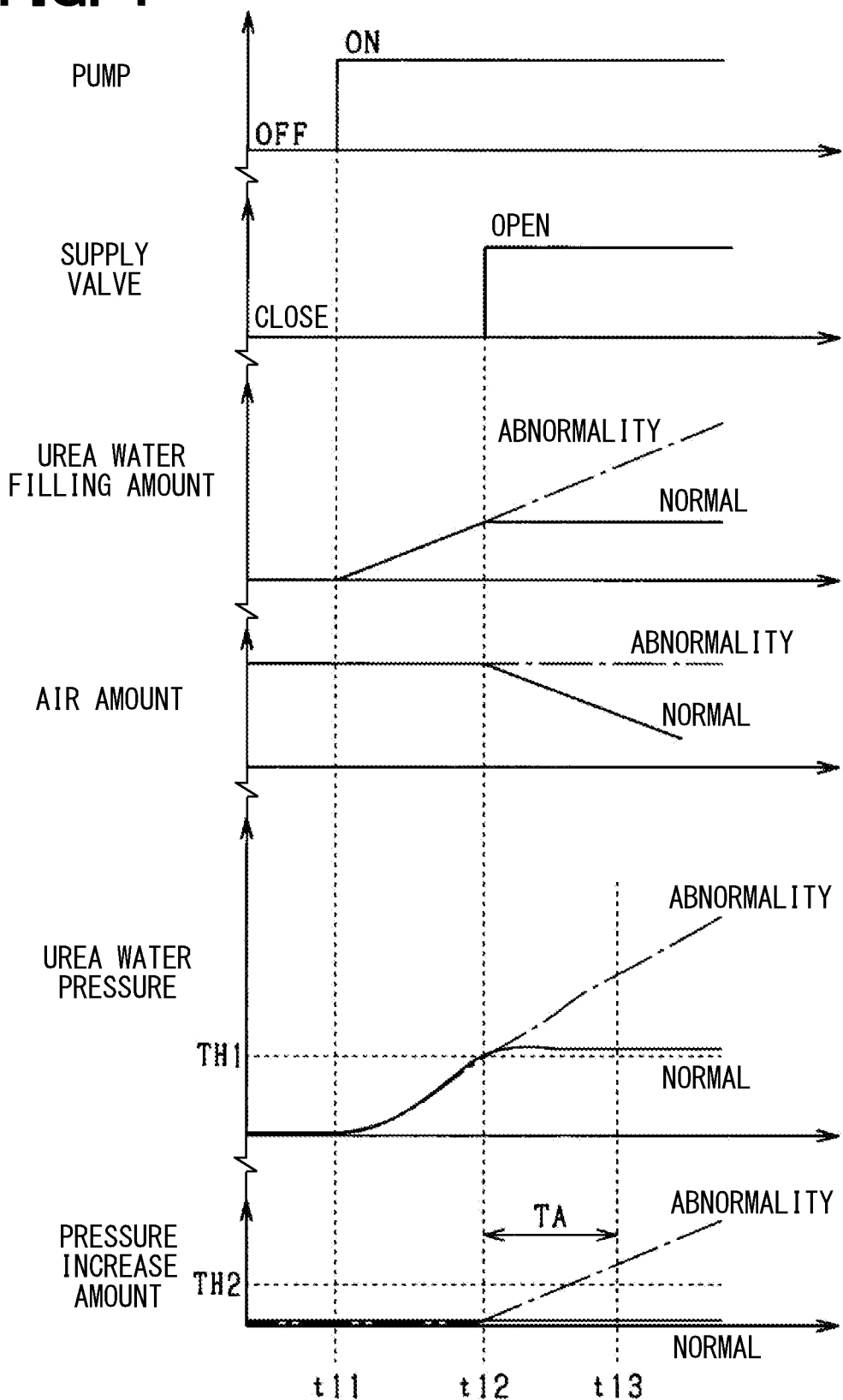
FIG. 4 is a time chart for explaining the abnormality determination process of the supply valve.

FIG. 4 is a time chart showing the abnormality determination process of the supply valve 21 in the present embodiment. In FIG. 4, similarly to FIG. 3, the parameter change in the case where the sticking abnormality does not occur in the supply valve 21, or in the case where the supply valve 21 is in the normal state, is indicated by the solid line, and the parameter change in the case where the sticking abnormality occurs is indicated by the dash-dot-dash line.

In FIG. 4, at timing t11, the pump 24 starts to be driven to rotate in the forward direction, and as a result, after timing t1, the filling amount of the urea water in the supply passage 23 gradually increases, and the urea water pressure gradually increases. Since the supply valve 21 is closed immediately after timing t1, the air in the supply passage 23 is compressed as the urea water filling amount increases, and the air pressure gradually increases.

Thereafter, at timing t12, the urea water pressure reaches the valve opening threshold TH1, and a valve opening command for the supply valve 21 is output. In this case, when the supply valve 21 is normally opened, a large amount of compressed air is released in the period from timing t11 to timing t12 before the supply valve 21 is opened, and the increase change in the urea water pressure temporarily decreases. That is, as shown by the solid line in FIG. 4, the amount of air in the supply passage 23 decreases sharply, and the increase change of the urea water pressure is reduced, and, for example, the urea water pressure becomes substantially constant.

The compressed air is not discharged at timing t12, and the urea water pressure increases and changes at a substantially constant speed as indicated by the dash-dot-dash line in FIG. 4 throughout before and after timing t12 when the sticking abnormality occurs in the supply valve 21. Contrary to this, when the supply valve 21 is normal, the increase change in the urea water pressure is reduced at timing t12 as described above. Therefore, the change in the urea water pressure is different between the normal state and the sticking abnormality state of the supply valve 21, and the presence or absence of the sticking abnormality of the supply valve 21 can be determined based on the change in the urea water pressure.

Thereafter, at timing t13 at which the predetermined period TA has elapsed from the valve opening command for the supply valve 21, it is determined whether there is a sticking abnormality of the supply valve 21 based on the pressure increase amount $\Delta P$ at timings t12 to t13. At this time, as indicated by the solid line, when the pressure increase amount $\Delta P$ is less than the diagnosis threshold TH2, it is determined that the supply valve 21 is in the normal state. Further, as indicated by the dash-dot-dash line, when the pressure increase amount $\Delta P$ is equal to or greater than the diagnosis threshold TH2, it is determined that the sticking abnormality occurs in the supply valve 21.

The present embodiment described in detail above achieves the following effect.

At the start of the operation of the exhaust gas purification system, after the filling of the urea water into the supply passage 23 by the pump driving is started, and when the urea water pressure in the supply passage 23 exceeds a predetermined valve opening pressure (valve opening threshold TH1), the valve opening command for the supply valve 21 is output, and the presence or absence of the sticking abnormality of the supply valve 21 is determined based on the urea water pressure after the output of the valve opening command. In this case, by making the change in the urea water pressure different between the normal state and the sticking abnormality state of the supply valve 21, it is possible to perform appropriate sticking determination based on the change in the urea water pressure. As a result, the determination accuracy of the sticking abnormality of the supply valve 21 can be improved.

Second Embodiment

In the present embodiment, a part of the abnormality determination process of the supply valve 21 is changed and will be described below.

If state parameters such as the temperature and the concentration in the urea water are different, a degree of a pressure loss is different when the urea water flows into the supply passage 23 by driving the pump, and a rate of increase of the urea water pressure, or a state of compression of the urea water, is affected. Therefore, in the present embodiment, the valve opening threshold TH1 (valve opening pressure) which is an output condition of the valve opening command for the supply valve 21 is variably set based on the state parameters of the urea water. Further, the diagnosis threshold TH12 of the pressure increase amount $\Delta P$ is variably set based on the state parameters of the urea water.

Figure 5:
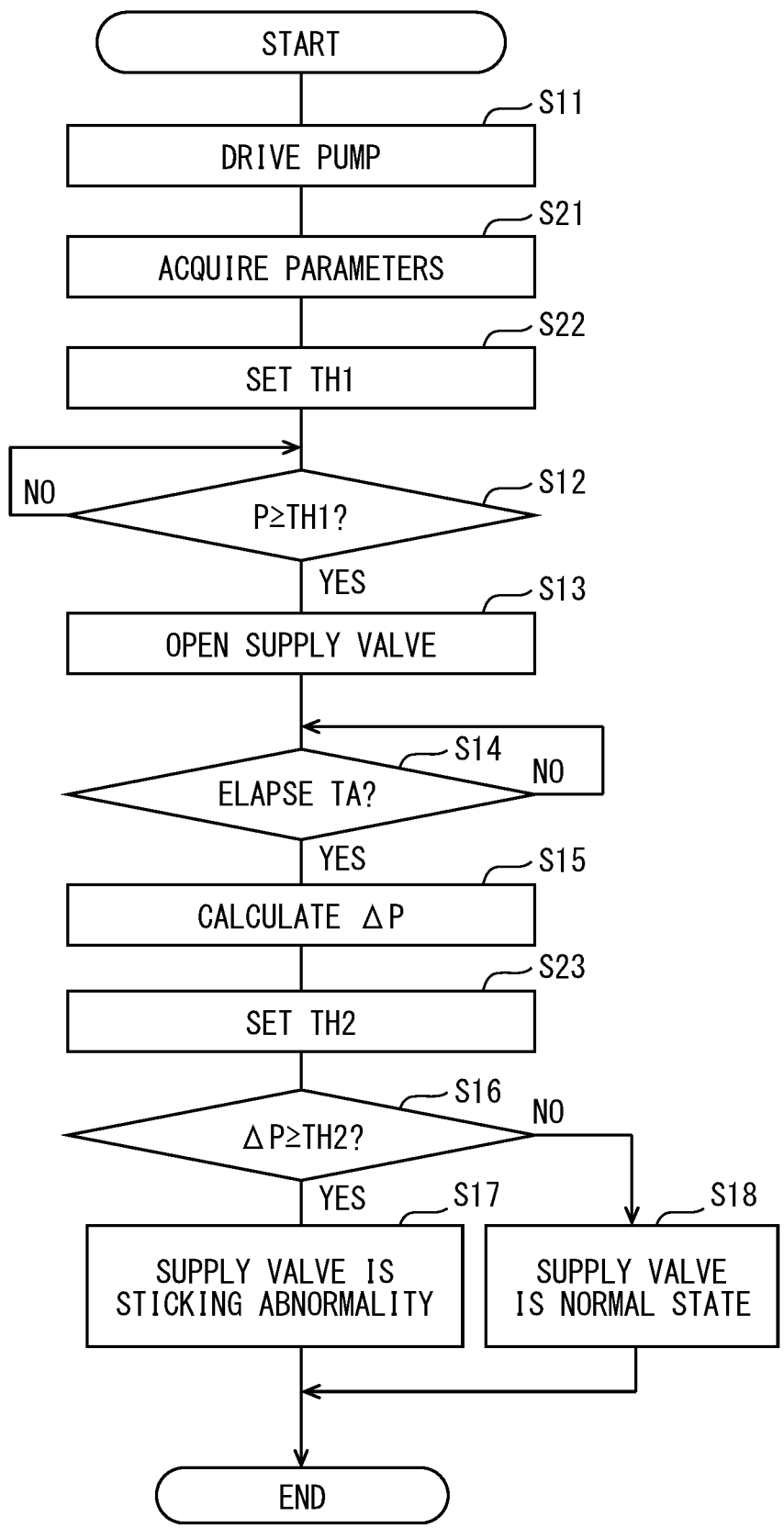
FIG. 5 is a flowchart illustrating an abnormality determination process of a supply valve according to a second embodiment.

FIG. 5 is a flowchart illustrating an abnormality determination process of a supply valve 21 according to the present embodiment. This processing is executed by the ECU 30 in place of the processing of FIG. 2 described above. In FIG. 5, the same steps as those in FIG. 2 are denoted by the same step numbers, and description thereof is omitted.

In FIG. 5, in step S21, for example, the temperature of the urea water is acquired as the state parameters. The temperature of the urea water may be acquired from a temperature sensor provided in the urea water tank 22 or a temperature sensor provided in the supply passage 23. In addition, an outside air temperature, or environmental temperature, detected by an outside air temperature sensor may be used as the urea water temperature.

Figure 6A:
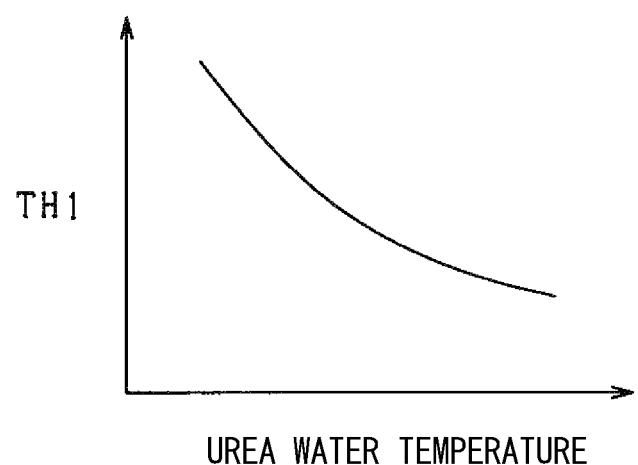
FIG. 6A is a diagram illustrating a relationship between a urea water temperature and a valve opening threshold TH1.

Thereafter, in step S22, the valve opening threshold TH1 which is the output condition of the valve opening command for the supply valve 21 is set based on the urea water temperature. At this time, the ECU 30 sets the valve opening threshold TH1 to a larger value as the urea water temperature is lower, for example, using a relationship of FIG. 6A. That is, viscosity of the urea water increases as the temperature decreases, and a pressure loss in the supply passage 23 increases. When the pressure loss in the supply passage 23 increases, a degree of air compression in the supply passage 23 decreases before the output of the valve opening command for the supply valve 21. Therefore, the effects of reducing the pressure increase due to the opening of the supply valve 21 is reduced, and there is a concern that the supply valve 21 may be erroneously determined to be the sticking abnormality when the supply valve 21 is in the normal state. Regarding this, by setting the valve opening threshold TH1 to a larger value as the urea water temperature is lower, the valve opening of the supply valve 21 can be delayed when the temperature of the urea water is low. As a result, the air in the supply passage 23 can be appropriately compressed and the ECU 30 can appropriately determine the sticking abnormality.

Figure 6B:
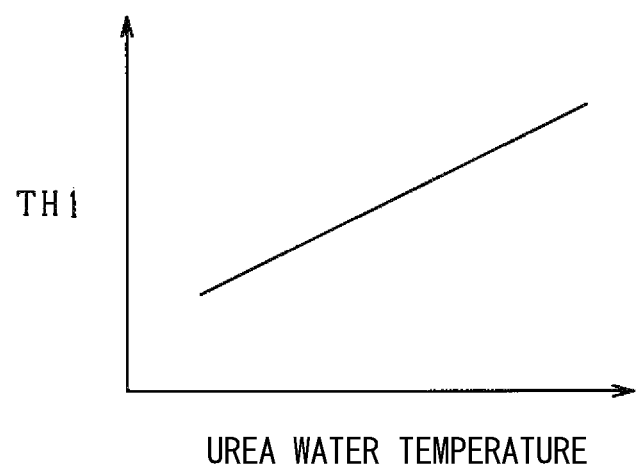
FIG. 6B is a diagram illustrating a relationship between a urea water concentration and the valve opening threshold TH1.

In step S21, the concentration of the urea water may be acquired as the state parameters, and in step S22, the valve opening threshold TH1, which is the output condition of the valve opening command for the supply valve 21, may be set based on the urea water concentration. The urea water concentration may be acquired from, for example, a concentration sensor provided in the urea water tank 22. At this time, the ECU 30 sets the valve opening threshold TH1 to a larger value as the urea water concentration is higher, for example, using a relationship of FIG. 6B. That is, the higher the concentration of the urea water, the higher the viscosity of the urea water, and the larger the pressure loss in the supply passage 23. In this case, by setting the valve opening threshold TH1 to a larger value as the urea water concentration is higher, the valve opening of the supply valve 21 can be delayed as described above.

Figure 7A:
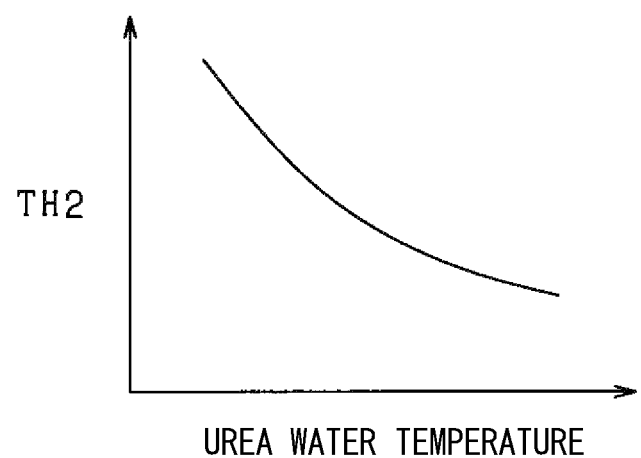
FIG. 7A is a diagram illustrating a relationship between the urea water temperature and a diagnosis threshold TH2.

After a calculation of the pressure increase amount $\Delta P$ in step S15, the diagnosis threshold TH2 of the pressure increase amount $\Delta P$ is set based on the urea water temperature in step S23. At this time, the ECU 30 sets the diagnosis threshold TH2 to a larger value as the urea water temperature is lower, for example, using a relationship of FIG. 7A. That is, when the urea water temperature is low and the pressure loss in the supply passage 23 increases, the degree of air compression before the output of the valve opening command for the supply valve 21 decreases, and the air discharge amount immediately after the valve opening of the supply valve 21 decreases. Therefore, the effects of reducing the pressure increase after the supply valve 21 is opened is reduced, and there is a concern that the supply valve 21 may be erroneously determined to be the sticking abnormality when the supply valve 21 is in the normal state. Regarding this, by setting the diagnosis threshold TH2 to a larger value as the urea water temperature is lower, the ECU 30 can appropriately determine the sticking abnormality.

Figure 7B:
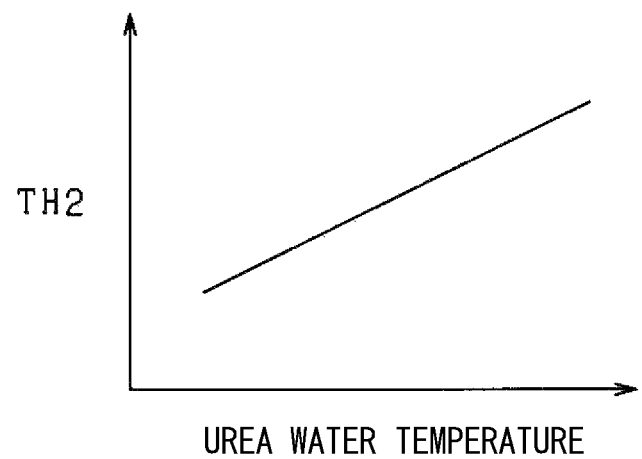
FIG. 7B is a diagram illustrating a relationship between the urea water concentration and the diagnosis threshold TH2.

In step S21, the concentration of the urea water may be acquired as the state parameters, and in step S23, the diagnosis threshold TH2 of the pressure increase amount ΔP may be set based on the urea water concentration. At this time, the ECU 30 sets the diagnosis threshold TH2 to a larger value as the urea water concentration is higher, for example, using a relationship of FIG. 7B. As a result, as described above, the ECU 30 can be appropriately determined the sticking abnormality.

In the present embodiment, step S21 corresponds to a "parameter acquirer", and steps S22, S23 correspond to a "setter". In step S23, the predetermined period TA may be variably set based on the urea water temperature or the urea water concentration. In this case, the ECU 30 may set the predetermined period TA to a shorter time as the urea water temperature is lower. Alternatively, the ECU 30 may set the predetermined period TA to a shorter time as the urea water concentration is higher.

According to the second embodiment, the valve opening threshold TH1, or the valve opening pressure, which is the output condition of the valve opening command for the supply valve 21 is variably set based on the urea water temperature or the urea water concentration which is the state parameter. As a result, even when a state of the air compression before the valve opening of the supply valve 21 is different due to a difference in a state of the urea water, the ECU 30 can be appropriately determined the sticking abnormality.

Further, the diagnosis threshold TH2 or the predetermined period TA of the pressure increase amount ΔP is variably set based on the urea water temperature or the urea water concentration which is the state parameter. As a result, even when the degree of the pressure increase immediately after the opening of the supply valve 21 is different due to the difference in the state of the urea water, the ECU 30 can be appropriately determined the sticking abnormality.

Third Embodiment

A residual air in the supply passage 23 is in a low compression state when a degree of compression of the urea water is small in a period from the start of the filling of the urea water by the pump driving to the output of the valve opening command for the supply valve 21. Therefore, an air discharge amount at the time of opening the supply valve 21 is reduced, and the effects of reducing the increase in the urea water pressure are reduced. In consideration of this point, in the present embodiment, in a case where the degree of the urea water compression is small in a period from the start of the filling of the urea water by the pump driving to the output of the valve opening command for the supply valve 21, a determination condition of the sticking abnormality determination performed based on the urea water pressure after the output of the valve opening command is changed to a side in which it is difficult to determine that the sticking abnormality is present, compared to a case where the degree of the urea water compression is large.

More specifically, the ECU 30 may variably set a predetermined period TA, which is a waiting time of the pressure increase after the output of the valve opening command for the supply valve 21, in the following manner.

Figure 8:
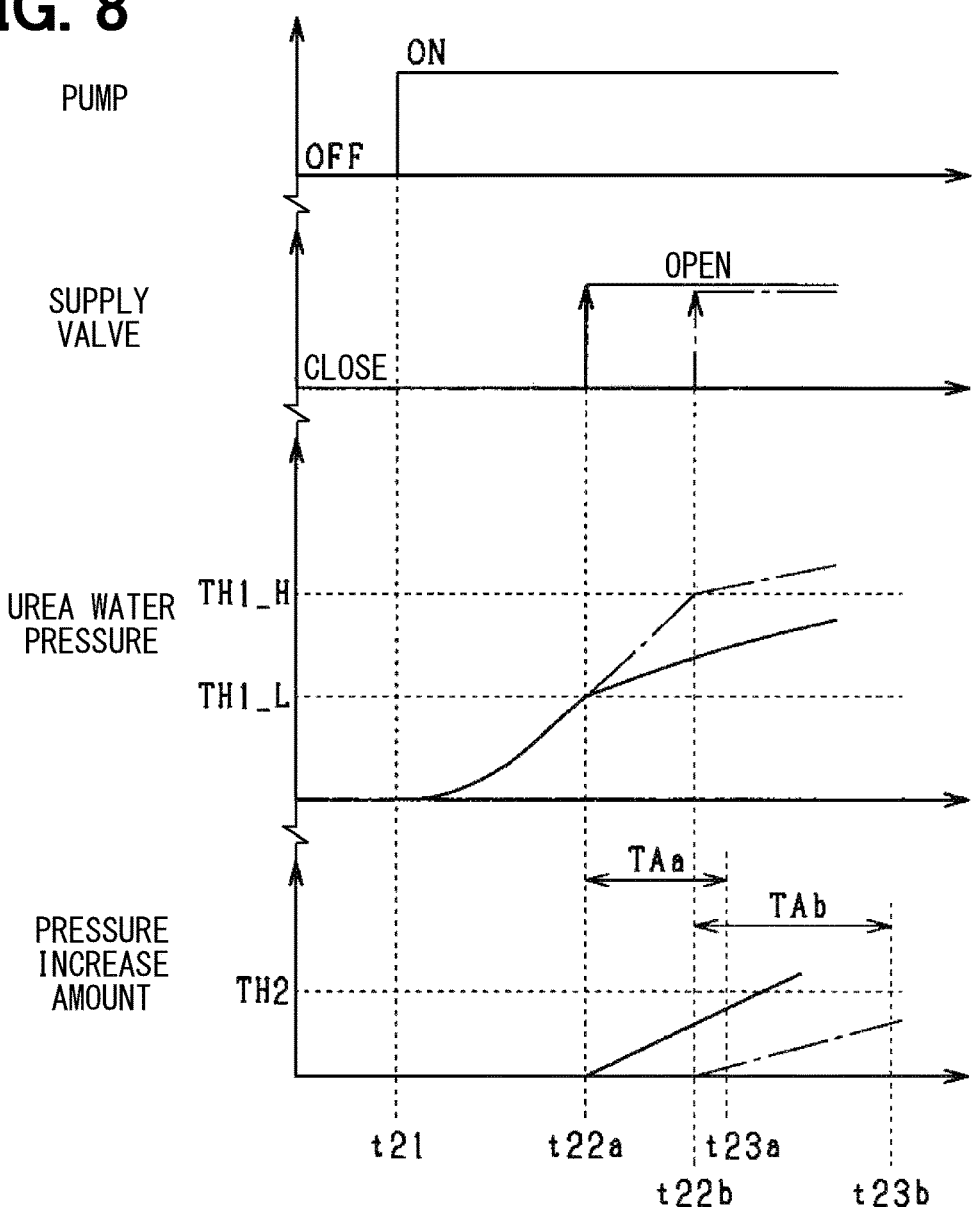
FIG. 8 is a time chart illustrating a difference in pressure change when a valve opening threshold TH1 is different in a third embodiment.

FIG. 8 is a time chart showing a difference in pressure change when the valve opening threshold TH1, or a valve opening pressure, which is an output condition of the valve opening command for the supply valve 21, is different. In FIG. 8, a low pressure threshold TH1_L of a low pressure and a high pressure threshold TH1_H of a high pressure are set as the valve opening threshold TH1, a pressure change when the valve opening command is output based on the low pressure threshold TH1_L is indicated by a solid line, and a pressure change when the valve opening command is output based on the high pressure threshold TH1_H is indicated by a dash-dot-dash line. It is assumed that the supply valve 21 is in the normal state.

In FIG. 8, after timing t21, the urea water pressure gradually increases with the start of the pump driving. When a low pressure threshold TH1_L is used as the valve opening threshold TH1, the urea water pressure reaches the low pressure threshold TH1_L at timing t22a, and the supply valve 21 is opened. In this case, since the compressed air in the supply passage 23 is discharged, the increase change in the urea water pressure is reduced. Thereafter, at timing t23a at which the predetermined period TAa has elapsed from the opening of the supply valve 21, the presence or absence of the sticking abnormality of the supply valve 21 is determined based on a comparison between the pressure increase amount ΔP and the diagnosis threshold TH2.

When a high pressure threshold TH1_H is used as the valve opening threshold TH1, the urea water pressure reaches the high pressure threshold TH1_H at timing t22b, and the supply valve 21 is opened. In this case, since the compressed air in the supply passage 23 is discharged, the increase change in the urea water pressure becomes small as in the pressure change of the solid line. However, in this case, the pressure increase rate is smaller than the pressure change indicated by the solid line. Thereafter, at timing t23b at which the predetermined period TAb has elapsed from the opening of the supply valve 21, the presence or absence of the sticking abnormality of the supply valve 21 is determined based on the comparison between the pressure increase amount ΔP and the diagnosis threshold TH2. The predetermined period TAa is shorter than predetermined period TAb when the predetermined periods TAa, TAb are compared.

When the valve opening threshold TH1 is different in magnitude, the compression state of the residual air at the valve opening timing of the supply valve 21 is different, and a difference occurs in the pressure increase speed immediately after the valve opening. Since the predetermined periods TAa, TAb are determined in consideration of this point, inconvenience that the supply valve 21 in the normal state is erroneously determined to be sticking abnormality is reduced.

Figure 9:
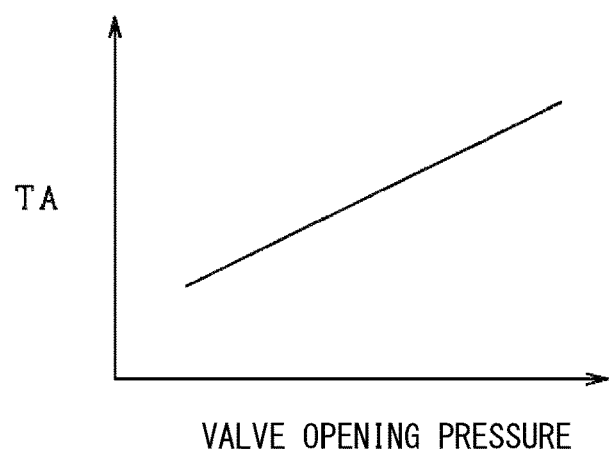
FIG. 9 is a diagram illustrating a relationship between a valve opening pressure and a predetermined period TA.

For example, in step S14 of FIG. 2, the ECU 30 may set the predetermined period TA based on a relationship of FIG. 9. In this case, the predetermined period TA may be set to a shorter time as the valve opening pressure, or the valve opening threshold TH1, that is the output condition of the valve opening command for the supply valve 21 is smaller. The valve opening pressure, or the valve opening threshold TH1, may be variably set based on a surrounding environmental temperature or the like. In the relationship of FIG. 9, the predetermined period TA may be determined in two or more stages according to the valve opening pressure, or the valve opening threshold TH1.

In the above configuration, in a case where the value on the low pressure side is used as the valve opening threshold TH1, the determination condition of the sticking abnormality determination performed based on the pressure increase amount ΔP is changed to a side where it is difficult to determine that there is a sticking abnormality, compared to a case where the value on the high pressure side is used. As a result, the accuracy of the abnormality determination of the supply valve can be improved.

The parameter indicating the degree of urea water compression in the period from the start of the urea water filling to the output of the valve opening command for the supply valve 21 may be other than the valve opening threshold TH1 described above. For example, in a configuration in which the valve opening command for the supply valve 21 is output at a timing when a predetermined time has elapsed from the start of the urea water filling, the urea water pressure, or the valve opening pressure, at a timing when the predetermined time has elapsed may be used as a parameter indicating the degree of the urea water compression.

In addition, as a configuration in which the determination condition of the sticking abnormality determination is changed to a side where it is difficult to determine that the sticking abnormality is present, a configuration other than the configuration in which the predetermined period TA described above is shortened may be adopted. For example, the diagnosis threshold TH2 may be increased.

Fourth Embodiment

In the present embodiment, in an exhaust gas purification system, two selective reduction catalysts, or a catalysts 12, are provided in an exhaust passage 11, and a supply valve 21 for supplying urea water is provided for each catalyst 12.

Figure 10:
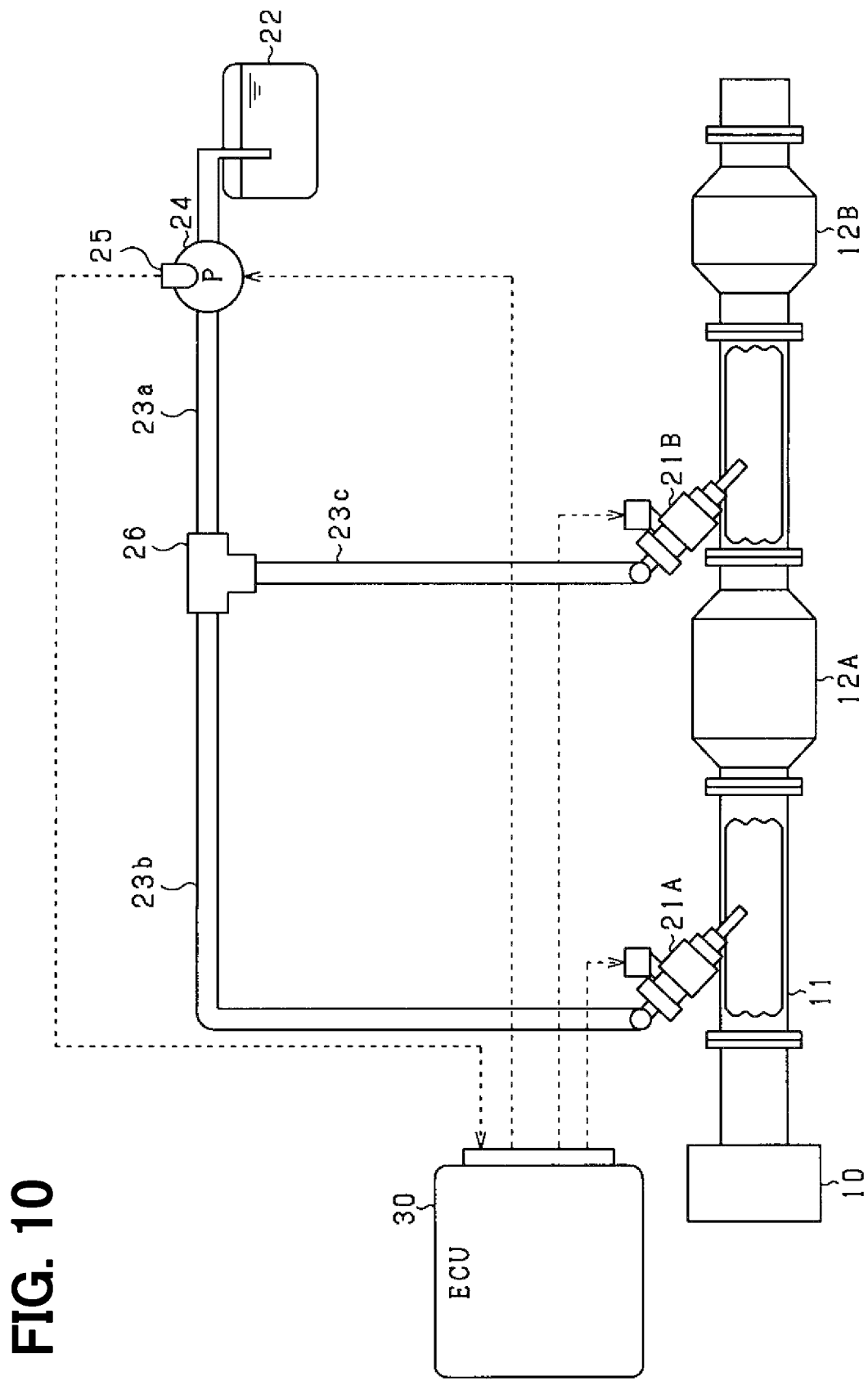
FIG. 10 is a schematic diagram illustrating an exhaust gas purification system according to a fourth embodiment.

FIG. 10 is a schematic diagram showing a configuration of the exhaust gas purification system in the present embodiment. As shown in FIG. 10, in the exhaust passage 11, the two catalysts 12 which are selective reduction catalysts are provided in series. A supply valve 21 is provided upstream of each catalyst 12. In the following description, the catalyst 12 at the upstream s is referred to as a first catalyst 12A, and the catalyst 12 at the downstream side is referred to as a second catalyst 12B. The supply valve 21 at the upstream side is referred to as a first supply valve 21A, and the supply valve 21 at the downstream side is referred to as a second supply valve 21B. The urea water is supplied to the upstream side of the first catalyst 12A by the first supply valve 21A, and the urea water is supplied to the upstream side of the second catalyst 12B by the second supply valve 21B.

The supply valves 21A, 21B and the urea water tank 22 communicate with each other through a supply passage 23. The supply passage 23 is provided as a passage branched in three directions, and a portion from the urea water tank 22 to a branching portion 26 is a common passage 23a, a portion from the branching portion 26 to the first supply valve 21A is a first passage 23b, and a portion from the branching portion 26 to the second supply valve 21B is a second passage 23c. The pump 24 is provided in the common passage 23a.

The ECU 30 determines the presence or absence of the sticking abnormality in each of the supply valves 21A, 21B based on the pressure change in the supply passage 23 under the pump driving state at the time of starting the operation of the exhaust gas purification system. That is, the ECU 30 performs the sticking abnormality determination of the first supply valve 21A after the output of the valve opening command for the first supply valve 21A, and performs the sticking abnormality determination of the second supply valve 21B after the determination of the sticking abnormality of the first supply valve 21A and after the output of the valve opening command for the second supply valve 21B.

Figure 11:
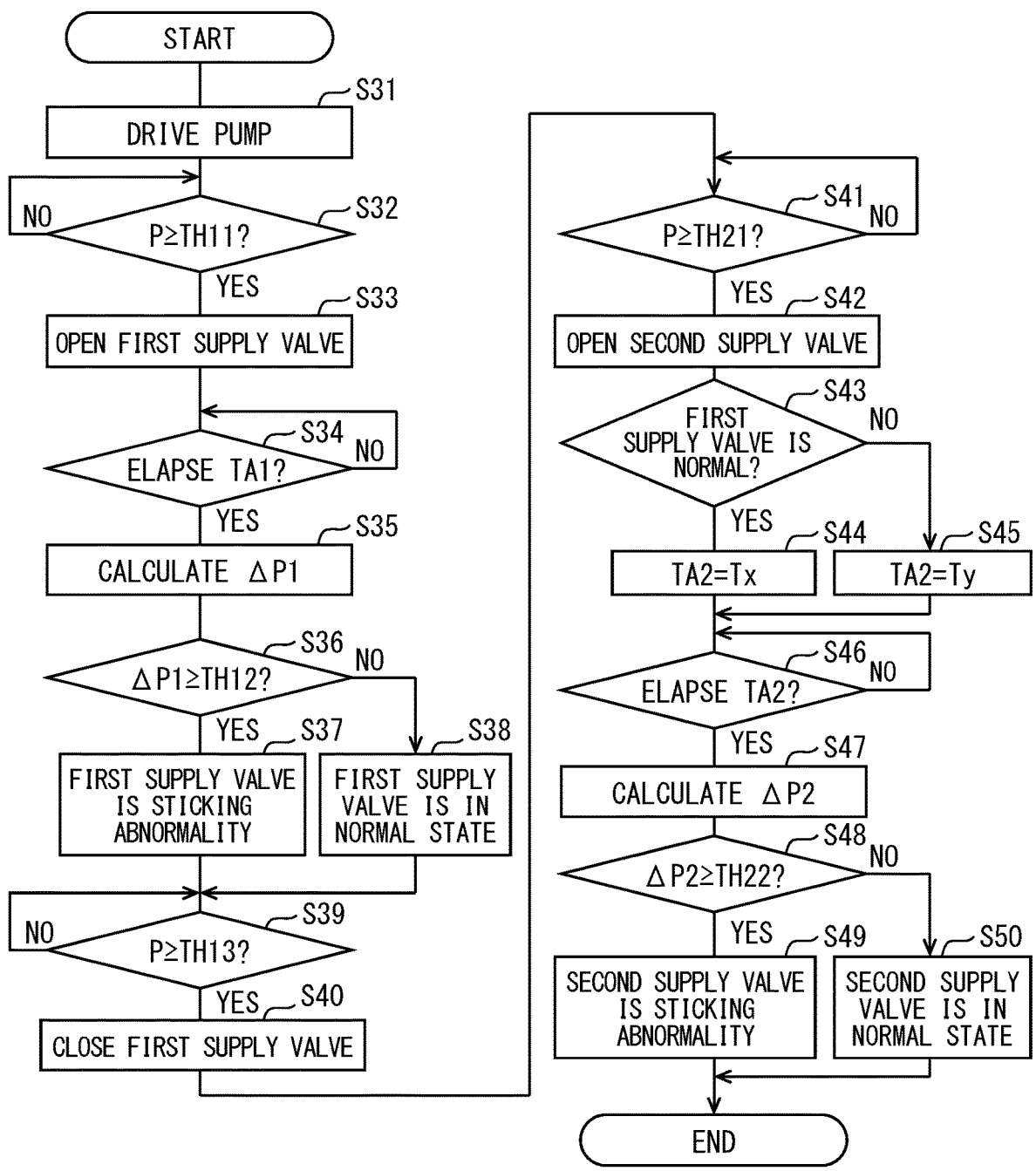
FIG. 11 is a flowchart illustrating an abnormality determination process of a supply valve according to the fourth embodiment.

FIG. 11 is a flowchart illustrating a processing procedure of abnormality determination of each of the supply valves 21A, 21B. This process is executed by the ECU 30 when the vehicle is powered on.

In FIG. 11, in steps S31 to S38, the abnormality determination of the first supply valve 21A is performed similarly to steps S11 to S18 of FIG. 2. Regarding the processing of steps S31 to S38, overlapping portions with steps S11 to S18 will be briefly described. In step S31, the pump 24 starts to be driven to rotate in the forward direction, and in the following step S32, it is determined whether the urea water pressure P is equal to or greater than the valve opening threshold TH11 which is the valve opening pressure of the first supply valve 21A. When an affirmative determination is made in step S32, the process proceeds to step S33, and a valve opening command for the first supply valve 21A is output.

Thereafter, in steps S34 and S35, an amount of increase in the urea water pressure P after the output of the valve opening command is calculated as the pressure increase amount ΔP1 at a timing when the predetermined period TA1 has elapsed after the output of the valve opening command for the first supply valve 21A. In the following step S36, it is determined whether the pressure increase amount ΔP1 is equal to or greater than the diagnosis threshold TH12. Then, when the pressure increase amount ΔP1 is equal to or greater than the diagnosis threshold TH12, the process proceeds to step S37, and it is determined that the sticking abnormality occurs in the first supply valve 21A. When the pressure increase amount ΔP1 is less than the diagnosis threshold TH12, the process proceeds to step S38, and it is determined that the first supply valve 21A is in the normal state.

Thereafter, in step S39, it is determined whether the urea water pressure P is equal to or greater than a predetermined valve closing threshold TH13. The valve closing threshold TH13 is set to a value larger than the valve opening threshold TH11. In this case, after the abnormality determination of the first supply valve 21A, the urea water pressure P is gradually increased by continuing the pump driving, and when the urea water pressure P reaches the valve closing threshold TH13, an affirmative determination is made in step S39, and the process proceeds to step S40. In step S40, the first supply valve 21A is closed.

Then, in step S41 and subsequent steps, the abnormality determination of the second supply valve 21B is performed. In step S41, it is determined whether the urea water pressure P is equal to or greater than the valve opening threshold TH21 which is the valve opening pressure of the second supply valve 21B. When an affirmative determination is made in step S41, the process proceeds to step S42, and the valve opening command for the second supply valve 21B is output.

Thereafter, in steps S43 to S45, the predetermined period TA2, which is a determination timing of the sticking abnormality in the second supply valve 21B, is set based on the abnormality determination result of the first supply valve 21A. That is, in step S43, it is determined whether the determination result of the first supply valve 21A is in the normal state. When the determination result of the first supply valve 21A is in the normal state, the process proceeds to step S44, and the predetermined period TA2 is set to a "first period Tx". When the determination result of the first supply valve 21A is the sticking abnormality, the process proceeds to step S45, and the predetermined period TA2 is set to a "second period Ty" which is a time longer than the first period Tx (Tx<Ty). The second period Ty may be the same time as the predetermined period TA1 used in the abnormality determination of the first supply valve 21A, and the first period Tx may be a time shorter than the predetermined period TA1.

That is, in the present embodiment, the embodiment when the sticking abnormality determination of the second supply valve 21B is performed is different between a case where it is determined that the first supply valve 21A as the abnormality determination target is normal in advance and a case where it is determined that the sticking abnormality occurs. More specifically, the predetermined period TA2 in a case where it is determined that the first supply valve 21A is in the normal state is set to be shorter than a time in a case where it is determined that the sticking abnormality occurs in the first supply valve 21A.

Thereafter, in step S46, it is determined whether the predetermined period TA2 has elapsed after the output of the valve opening command for the second supply valve 21B. When the determination in step S46 is affirmative, the process proceeds to subsequent step S47. In step S47, the amount of increase in the urea water pressure P after the output of the valve opening command for the second supply valve 21B is calculated as the pressure increase amount $\Delta P2$.

In subsequent step S48, it is determined whether the pressure increase amount $\Delta P2$ is equal to or greater than the diagnosis threshold TH22. Then, when the pressure increase amount $\Delta P2$ is equal to or greater than the diagnosis threshold TH22, the process proceeds to step S49, and it is determined that the sticking abnormality occurs in the second supply valve 21B. When the pressure increase amount $\Delta P2$ is less than the diagnosis threshold TH22, the process proceeds to step S50, and it is determined that the second supply valve 21B is in the normal state.

In FIG. 11, steps S36 to S38 correspond to a "first determination unit", and steps S48 to S50 correspond to a "second determination unit". Steps S39 and S40 correspond to a "valve closing command unit".

Figure 12:
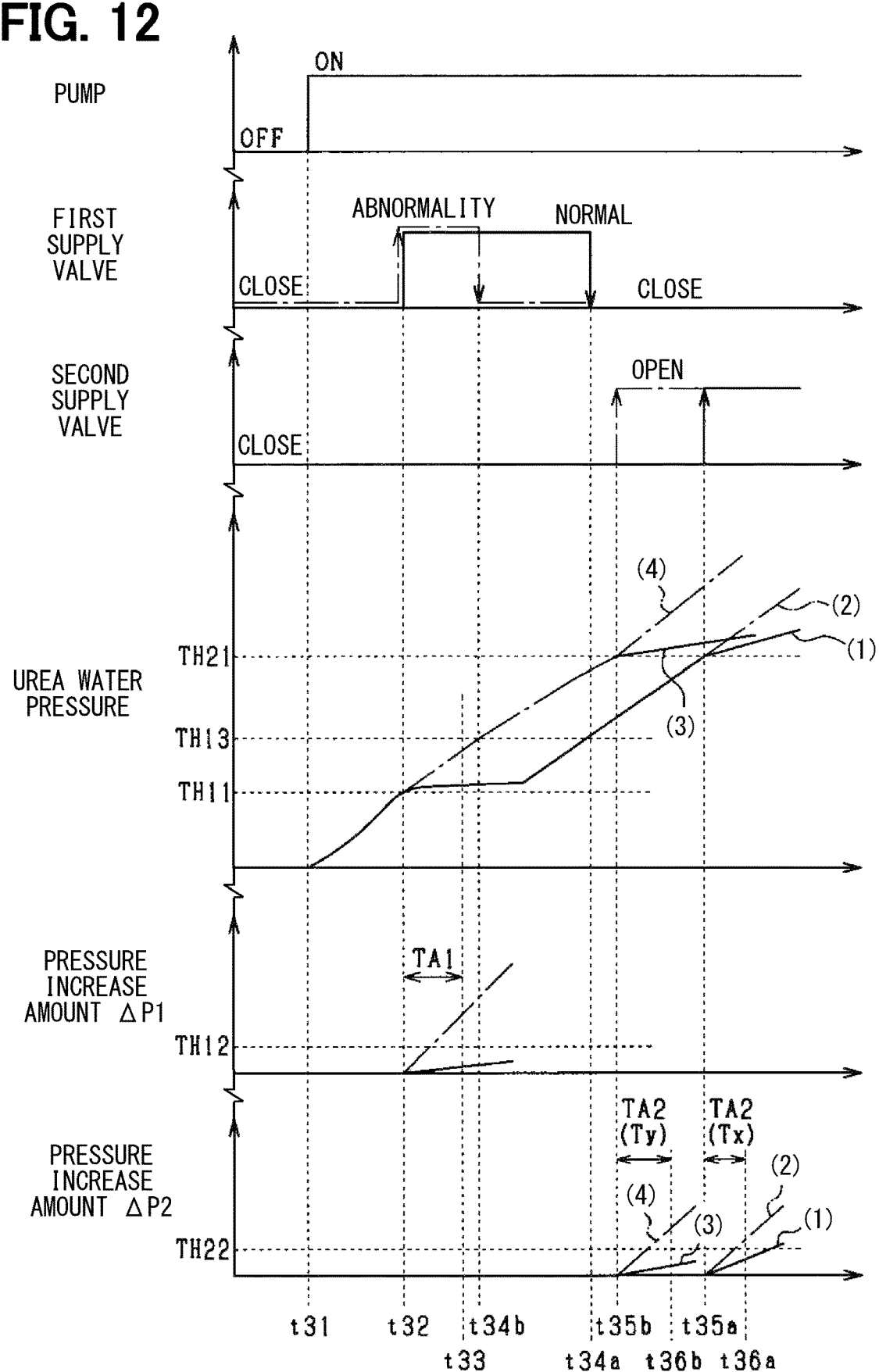
FIG. 12 is a time chart for explaining an abnormality determination process of the supply valve.

Next, the abnormality determination process of each of the supply valves 21A, 21B described above will be described more specifically with reference to the time chart of FIG. 12. In FIG. 12, the parameter change in a case where the sticking abnormality does not occur in each of the supply valves 21A, 21B, or the supply valves 21A, 21B are in the normal state, is indicated by a solid line, and the parameter change in the case where the sticking abnormality occurs is indicated by a dash-dot-dash line.

In FIG. 12, at timing t31, the pump 24 starts to be driven to rotate in the forward direction, whereby the urea water pressure in the supply passage 23 gradually increases after timing t31. Since the supply valves 21A, 21B are both in the closed state at timings t31 to t32, the air in the supply passage 23 is compressed with an increase in the urea water filling amount, and the air pressure gradually increases.

Thereafter, at timing t32, the urea water pressure reaches the valve opening threshold TH11, and the valve opening command for the first supply valve 21A is output. In this case, when the first supply valve 21A is normally opened, a large amount of air compressed in a period from timing t31 to timing t32 before the valve is opened is discharged, and an increase change in the urea water pressure is reduced. As a result, as indicated by the solid line in FIG. 12, the increase change in the urea water pressure is reduced, and, for example, the urea water pressure becomes substantially constant. Thereafter, at timing t33, the pressure increase amount $\Delta P1$ after the valve opening command for the first supply valve 21A becomes less than the diagnosis threshold TH12, and it is determined that the first supply valve 21A is in the normal state.

In addition, when the first supply valve 21A is in a normal state, the air in the supply passage 23 is continuously discharged by the continuation of the pump driving, and when all the air in the supply passage 23 is discharged, the rate of increase in the urea water pressure increases. Thereafter, at timing t34a, the urea water pressure P reaches the valve closing threshold TH13, and the first supply valve 21A is closed.

On the other hand, when the sticking abnormality has occurred in the first supply valve 21A and the first supply valve 21A is maintained in the closed state, the compressed air is not discharged at timing t32, and the urea water pressure increases and changes at a substantially constant speed as indicated by the dash-dot-dash line in FIG. 12 before and after timing t32. Thereafter, at timing t33, the pressure increase amount $\Delta P1$ after the valve opening command for the first supply valve 21A becomes equal to or greater than the diagnosis threshold TH12, and it is determined that the sticking abnormality occurs in the first supply valve 21A. Thereafter, at timing t34b, the urea water pressure P reaches the valve closing threshold TH13, and the first supply valve 21A is closed.

After the abnormality determination processing of the first supply valve 21A is performed, the valve closing command of the first supply valve 21A is output after the urea water pressure P reaches the valve closing threshold TH13 (the valve closing pressure) determined at a pressure higher than the valve opening threshold TH11 (the valve opening pressure), in other words, after all the air in the supply passage 23 is discharged. Thereafter, the abnormality determination of the second supply valve 21B is performed.

The abnormality determination of the second supply valve 21B is started at a different timing according to the result of the abnormality determination of the first supply valve 21A performed in advance. When the determination result of the first supply valve 21A is in the normal state, the valve opening command for the second supply valve 21B is output in response to the urea water pressure reaching the valve opening threshold TH21 at timing t35a, and the abnormality determination of the second supply valve 21B is started. Contrary to this, when the determination result of the first supply valve 21A is abnormal (there is a sticking abnormality), the valve opening command for the second supply valve 21B is output in response to the urea water pressure reaching the valve opening threshold TH21 at timing t35b, and the abnormality determination of the second supply valve 21B is started.

In FIG. 12, a change in the urea water pressure P at a time of the abnormality determination of the second supply valve 21B is shown in four ways of (1) the normal state and (2) the abnormal state of the first supply valve 21A and (3) the normal state and (4) the abnormal state of the second supply valve 21B. A number 1 indicates a pressure change when the first supply valve 21A is in the normal state and the second supply valve 21B is in the normal state. The number 2 indicates a pressure change when the first supply valve 21A is in the normal state and the second supply valve 21B is abnormal. The number 3 indicates a pressure change when the first supply valve 21A is abnormal and the second supply valve 21B is in the normal state. The number 4 indicates a pressure change when the first supply valve 21A is abnormal and the second supply valve 21B is abnormal.

When the determination result of the first supply valve 21A is in the normal state, the valve opening command for the second supply valve 21B is output at timing t35a, and thereafter, at timing t36a at which the predetermined period TA2 (the first period Tx) has elapsed from the output of the valve opening command, the abnormality determination of the second supply valve 21B is performed based on the pressure increase amount ΔP2. In this case, the pressure increase amount ΔP increases both in the normal state and in the abnormal state of the second supply valve 21B (refer to circled numerals 1 and 2 in FIG. 12). However, since a magnitude of the pressure increase amount ΔP differs depending on whether the second supply valve 21B is in the normal or abnormal, the ECU 30 can determine the presence or absence of the sticking abnormality based on the diagnosis threshold TH22. More specifically, at timing t36a, when the pressure increase amount ΔP2 is less than the diagnosis threshold TH22, it is determined that the second supply valve 21B is in the normal state (circled number 1), and when the pressure increase amount ΔP2 is equal to or greater than the diagnosis threshold TH22, it is determined that the sticking abnormality of the second supply valve 21B occurs (circled number 2).

When the first supply valve 21A is in the normal state (not stuck), the amount of air remaining in the supply passage 23 is 0 or a small amount. In this case, when the residual air amount is small, the pressure increase speed in a state in which the second supply valve 21B is opened is higher than that in a case where the residual air amount is large. Regarding this, the predetermined period TA2 (the first period Tx) is shorter than the predetermined period TA1.

On the other hand, when the sticking abnormality occurs in the first supply valve 21A, the valve opening command for the second supply valve 21B is output at timing t35b, and thereafter, at timing t36b when the predetermined period TA2 (the second period Ty) has elapsed from the output of the valve opening command, the abnormality determination of the second supply valve 21B is performed based on the pressure increase amount ΔP2. In this case, the compressed air is present in the supply passage 23, and the magnitude of the pressure increase amount ΔP significantly differs depending on whether the second supply valve 21B is in the normal or abnormal. At timing t36b, when the pressure increase amount ΔP2 is less than the diagnosis threshold TH22, it is determined that the second supply valve 21B is in the normal state (circled number 3), and when the pressure increase amount ΔP2 is equal to or greater than the diagnosis threshold TH22, it is determined that the sticking abnormality of the second supply valve 21B occurs (circled number 4).

As described above, in the fourth embodiment, the presence or absence of the sticking abnormality of each of the supply valves 21A, 21B is individually determined at a time of starting the exhaust gas purification system. As a result, in the exhaust gas purification system including the plurality of supply valves 21A, 21B, the ECU 30 can appropriately determine whether each of the supply valves 21A, 21B is in the normal state or has a sticking abnormality.

After the abnormality determination of the first supply valve 21A, the first supply valve 21A is closed after waiting for the urea water pressure to rise to the valve closing threshold TH13 (the valve closing pressure) on the high pressure side from the valve opening threshold TH1 (the valve opening pressure), and the abnormality determination of the second supply valve 21B is performed after the first supply valve 21A is closed. In this case, assuming that the first supply valve 21A is in the normal state, a state in which the urea water pressure increases to the valve closing threshold TH13 after the abnormality determination is performed in the valve open state of the first supply valve 21A is considered to be a state in which all the air in the supply passage 23 is discharged. Then, by performing the abnormality determination of the second supply valve 21B in a state where the air discharge is completed, the ECU 30 can improve the determination accuracy of the sticking abnormality as compared with a case where the abnormality determination is performed in a state where the air remains.

When the sticking abnormality determination of the first supply valve 21A and the second supply valve 21B is performed at a time of starting the exhaust gas purification system, the amount of air remaining in the supply passage 23 at a time of the abnormality determination of the second supply valve 21B is different depending on whether the first supply valve 21A which is performed first is in the normal state or the sticking abnormality occurs. Regarding this, the embodiment when the sticking abnormality determination of the second supply valve 21B is performed is different between a case where it is determined that the first supply valve 21A is in the normal state and a case where it is determined that the sticking abnormality occurs in the first supply valve 21A. As a result, the ECU 30 can reduce erroneous determination of the abnormality of the second supply valve 21B due to the difference in the residual air amount at the time of determining the abnormality of the second supply valve 21B.

When it is determined that the second supply valve 21B is abnormal, if the first supply valve 21A that has been previously determined to be abnormal is in the normal state (not stuck), the amount of air remaining in the supply passage 23 is 0 or a small amount. In this case, when the residual air amount is small, the pressure increase speed in a state in which the second supply valve 21B is opened is higher than that in a case where the residual air amount is large. Regarding this, at a time of abnormality determination of the second supply valve 21B, the predetermined period TA2 in a case where it is determined that the first supply valve 21A is in the normal state is shorter than a time in a case where it is determined that the sticking abnormality occurs in the first supply valve 21A. As a result, the ECU 30 can improve the accuracy of the abnormality determination of the second supply valve 21B.

Fifth Embodiment

In the present embodiment, a part of abnormality determination process of each of supply valves 21A, 21B is changed from the fourth embodiment. In the present embodiment, a diagnosis threshold TH22 used for the abnormality determination of the second supply valve 21B is changed according to the determination result of the first supply valve 21A.

Figure 13:
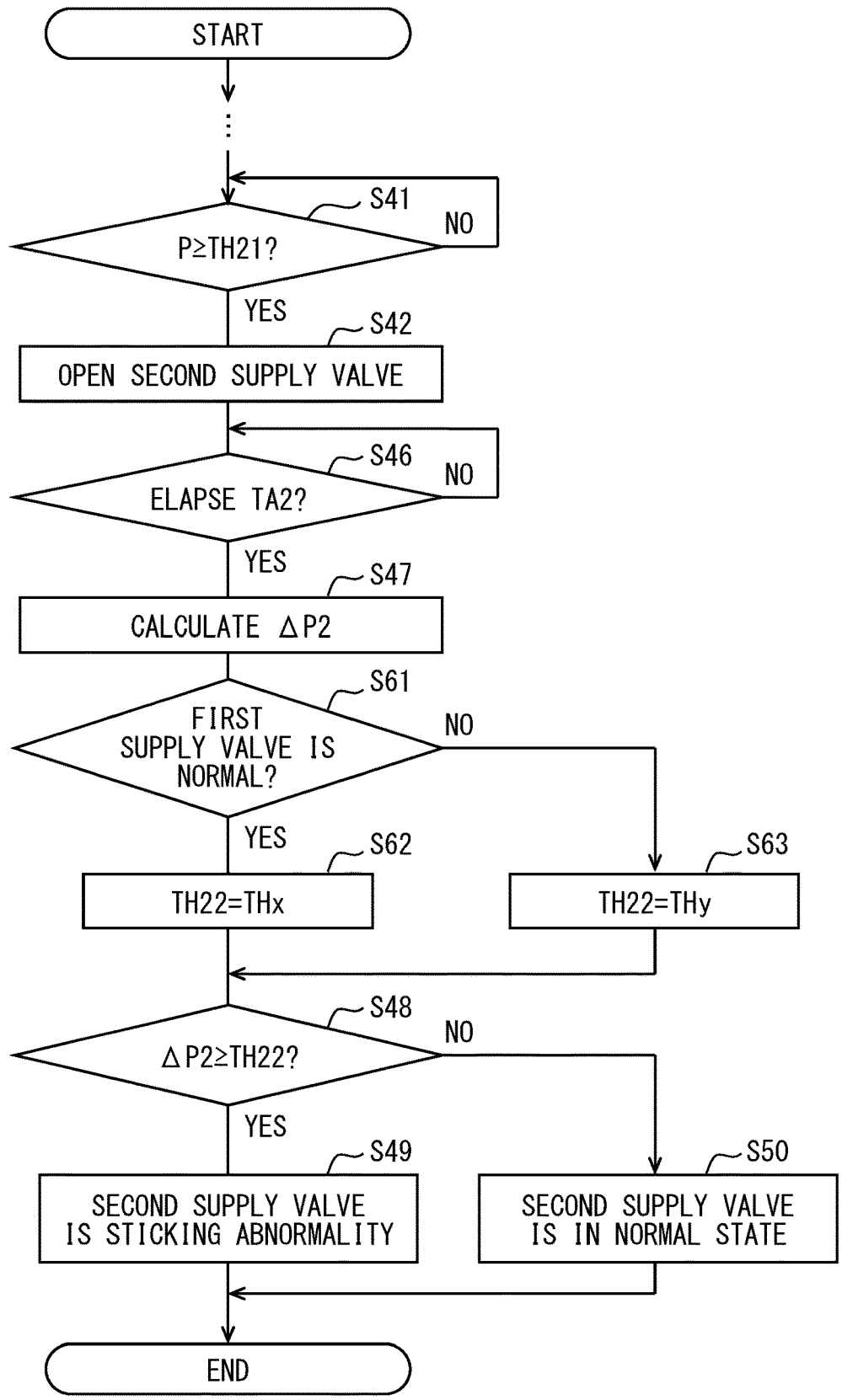
FIG. 13 is a flowchart illustrating an abnormality determination process of a supply valve according to a fifth embodiment.

FIG. 13 is a flowchart illustrating a processing procedure of the abnormality determination of each of the supply valves 21A, 21B, and this processing is partially modified from the processing of FIG. 11. Note that, in FIG. 13, the same step numbers are assigned to the same processes as those in FIG. 11, and a part thereof is not illustrated, and the description thereof is omitted.

In FIG. 13, step S41 and the subsequent steps, which are the abnormality determination processing of the second supply valve 21B, are shown. In step S41, it is determined whether the urea water pressure P is equal to or greater than the valve opening threshold TH21. When an affirmative determination is made in step S41, the valve opening command for the second supply valve 21B is output in step S42.

Thereafter, in step S46, it is determined whether the predetermined period TA2 has elapsed after the output of the valve opening command for the second supply valve 21B. When the determination in step S46 is affirmative, the process proceeds to subsequent step S47. In step S47, the amount of increase in the urea water pressure P after the output of the valve opening command for the second supply valve 21B is calculated as the pressure increase amount ΔP2.

Thereafter, in steps S61 to S63, the diagnosis threshold TH22 is set for the second supply valve 21B based on the abnormality determination result of the first supply valve 21A. That is, in step S61, it is determined whether the determination result of the first supply valve 21A is in the normal state. When the determination result of the first supply valve 21A is in the normal state, the process proceeds to step S62, and the diagnosis threshold TH22 is set to a first diagnosis threshold THx. When the determination result of the first supply valve 21A is the sticking abnormality, the process proceeds to step S63, and the diagnosis threshold TH22 is set to a second diagnosis threshold THy smaller than the first diagnosis threshold THx (THx>THy). The second diagnosis threshold THy may be the same value as the diagnosis threshold TH12 used in the abnormality determination of the first supply valve 21A, and the first diagnosis threshold THx may be a value larger than the diagnosis threshold TH12.

In step S48, it is determined whether the pressure increase amount ΔP2 is equal to or greater than the diagnosis threshold TH22. Then, when the pressure increase amount ΔP2 is equal to or greater than the diagnosis threshold TH22, the process proceeds to step S49, and it is determined that the sticking abnormality occurs in the second supply valve 21B. When the pressure increase amount ΔP2 is less than the diagnosis threshold TH22, the process proceeds to step S50, and it is determined that the second supply valve 21B is in the normal state.

As shown in FIG. 12, two diagnosis thresholds TH22 (THx, THy.) are set depending on whether the first supply valve 21A is in the normal or abnormal state. In this case, when the first supply valve 21A is in the normal state, the first diagnosis threshold THx is set as the diagnosis threshold TH22 at timing t36a. The first diagnosis threshold THx is a higher value of the two diagnosis thresholds TH22. Further, in a case where the sticking abnormality occurs in the first supply valve 21A, the second diagnosis threshold THy is set as the diagnosis threshold TH22 at timing t36b. The second diagnosis threshold THy is a smaller value of the two diagnosis thresholds TH22.

As described above, in the fifth embodiment, the diagnosis threshold TH22 (an abnormality determination threshold) when it is determined that the first supply valve 21A is in the normal state is set to a value larger than that when it is determined that the sticking abnormality occurs in the first supply valve 21A. As a result, the ECU 30 can improve the accuracy of the abnormality determination of the second supply valve 21B.

Sixth Embodiment

In the present embodiment, similarly to the first embodiment, an exhaust gas purification system is provided with one selective reduction catalyst 12a and one urea water supply valve 21 (see FIG. 1). In the present embodiment, it is possible to determine whether the supply valve 21 is a sticking abnormality in a closed state and whether the supply valve 21 is a sticking abnormality in an open state.

Figure 14:
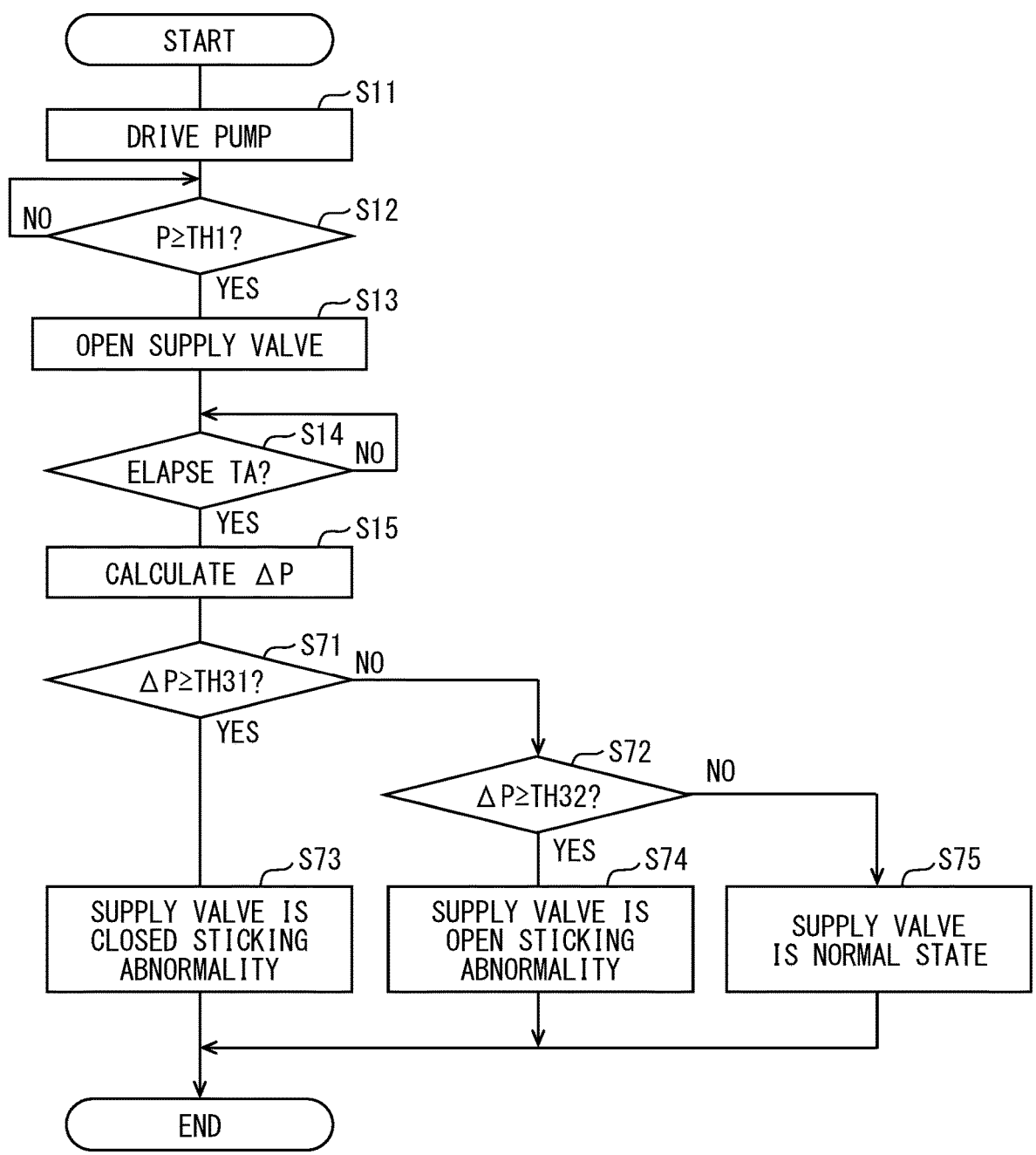
FIG. 14 is a flowchart illustrating an abnormality determination process of a supply valve according to a sixth embodiment.

FIG. 14 is a flowchart illustrating an abnormality determination process of a supply valve 21 according to the present embodiment. This processing is executed by the ECU 30 in place of the processing of FIG. 2 described above. In FIG. 14, the same steps as those in FIG. 2 are denoted by the same step numbers, and description thereof is omitted.

In FIG. 14, as described above, after the start of the pump driving, the valve opening command for the supply valve 21 is output as the urea water pressure P reaches the valve opening threshold TH1, and thereafter, the pressure increase amount ΔP is calculated at the timing when the predetermined period TA has elapsed (steps S11 to S15).

Thereafter, in step S71, it is determined whether the pressure increase amount ΔP is equal to or greater than the diagnosis threshold TH31, and in step S72, it is determined whether the pressure increase amount ΔP is equal to or greater than the diagnosis threshold TH32. The diagnosis threshold TH31 is an abnormality determination threshold for closed fixation determination, and the diagnosis threshold TH32 is an abnormality determination threshold for open fixation determination. In addition, TH31 >TH32, and the abnormality determination threshold for the closed fixation determination is larger than the abnormality determination threshold for the open fixation determination.

In this case, when the pressure increase amount ΔP is equal to or greater than the diagnosis threshold TH31 and the determination in step S71 is affirmative, the process proceeds to step S73, and it is determined that the closing and sticking abnormality occurs in the supply valve 21. When the pressure increase amount ΔP is the diagnosis threshold TH31 to TH32 and the determination in step S72 is affirmative, the process proceeds to step S74, and it is determined that the open sticking abnormality has occurred in the supply valve 21. When the pressure increase amount ΔP is less than the diagnosis threshold TH32 and the result of step S72 is negative, the process proceeds to step S75 and it is determined that the supply valve 21 is in the normal state.

Figure 15:
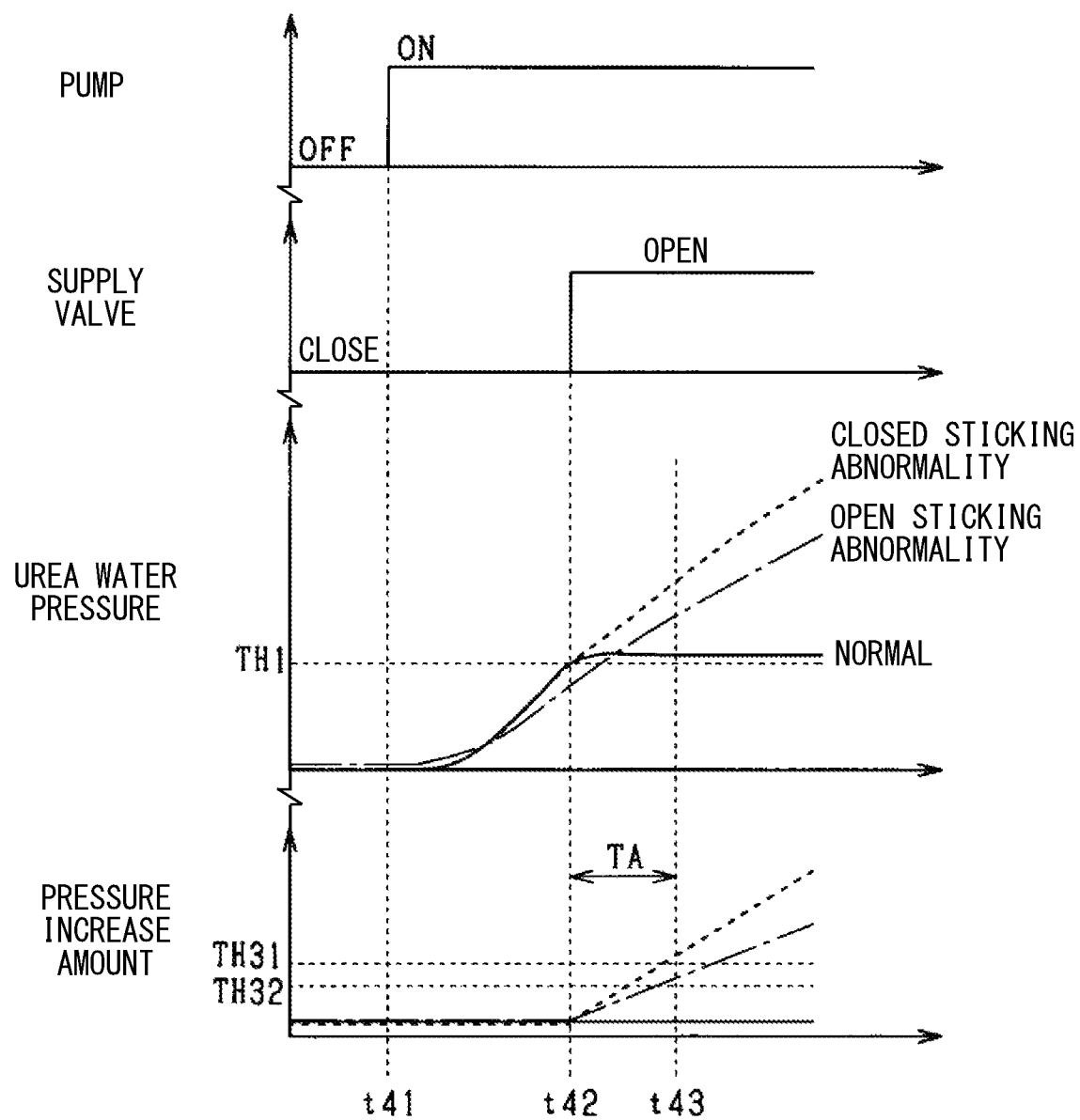
FIG. 15 is a time chart for explaining the abnormality determination process of the supply valve.

Next, the abnormality determination process of the supply valve 21 in the present embodiment will be described more specifically with reference to the time chart of FIG. 15. In FIG. 15, a parameter change in a case where the sticking abnormality does not occur in the supply valve 21 (in the normal state) is indicated by a solid line, the parameter change in a case where the closed sticking abnormality occurs is indicated by a broken line, and the parameter change in a case where the open sticking abnormality occurs is indicated by a dash-dot-dash line.

In FIG. 15, at timing t41, the pump 24 starts to be driven to rotate in the forward direction, and at timing t42, the urea water pressure reaches the valve opening threshold TH1, and a valve opening command for the supply valve 21 is output. In this case, if the supply valve 21 is in the normal state, the supply valve 21 is opened in response to the valve opening command, and a large amount of compressed air is discharged at once. As a result, the increase change in the urea water pressure is reduced as indicated by the solid line in FIG. 15.

Contrary to this, when the closing and sticking abnormality occurs in the supply valve 21, the supply valve 21 remains in the closed state regardless of the valve opening command, and the urea water pressure increases and changes at a substantially constant speed as indicated by the broken line in FIG. 15 throughout before and after timing t42. In addition, in a case where the open sticking abnormality occurs in the supply valve 21, the supply valve 21 remains in the open state before and after timing t42, and the urea water pressure increases and changes at a substantially constant speed as indicated by the dash-dot-dash line in FIG. 15. In a case where any one of the closed sticking abnormality and the open sticking abnormality occurs in the supply valve 21, since the amount of increase in the urea water pressure after the output of the valve opening command is larger than that in the normal state, the ECU 30 is capable of determining the sticking abnormality. Further, when the closed sticking abnormality and the open sticking abnormality are compared, in the open sticking abnormality, a degree of increase in the urea water pressure is reduced by an amount corresponding to the occurrence of air discharge at the time of filling the urea water by driving the pump. Therefore, the ECU 30 is capable of distinguishing between the closed sticking abnormality and the open sticking abnormality based on the difference in the degree of increase in the urea water pressure.

At timing t43 at which the predetermined period TA has elapsed from the opening of the supply valve 21, it is determined whether there is the sticking abnormality of the supply valve 21B based on the pressure increase amount ΔP. At this time, as indicated by the solid line, when the pressure increase amount ΔP is less than the diagnosis threshold TH32, it is determined that the supply valve 21 is in the normal state. Further, as indicated by the dash-dot-dash line, when the pressure increase amount ΔP is the diagnosis threshold TH31 to TH32, it is determined that the open sticking abnormality occurs in the supply valve 21, and as indicated by the broken line, when the pressure increase amount ΔP is equal to or greater than the diagnosis threshold TH31, it is determined that the closed sticking abnormality occurs in the supply valve 21.

According to the sixth embodiment described above, since the diagnosis threshold TH31 for the closed sticking determination is set to a value larger than the diagnosis threshold TH32 for the open sticking determination, the closed sticking abnormality and the open sticking abnormality can be appropriately determined based on the difference in the degree of increase in the urea water pressure between the closed sticking abnormality and the open sticking abnormality.

Other Embodiments

A part of the configuration of the above embodiment may be modified as follows.

In each of the above embodiments, the presence or absence of the sticking abnormality in the supply valve 21 is determined based on the pressure increase amount ΔP until the predetermined period elapses after the valve opening command for the supply valve 21 is output, but this may be changed. For example, the presence or absence of the sticking abnormality in the supply valve 21 may be determined based on a slope of the increase in the urea water pressure (pressure increase rate) after the output of the valve opening command for the supply valve 21 or an integrated value of the pressure increase until a predetermined period elapses. In short, the pressure increase value indicating the increase change in the urea water pressure after the output of the valve opening command for the supply valve 21 may be acquired, and the abnormality determination of the supply valve 21 may be performed based on the pressure increase value.

In the exhaust gas purification system (see the system of FIG. 10) including the first supply valve 21A and the second supply valve 21B, the valve opening thresholds TH11 and TH21, which are the output conditions of the valve opening command, may be variably set based on state parameters such as the urea water temperature and the urea water concentration at a time of the abnormality determination of each of the supply valves 21A, 21B. In addition, at the time of abnormality determination of each of the supply valves 21A, 21B, the predetermined periods TA1, TA2 or the diagnosis thresholds TH12, TH22 may be variably set based on state parameters such as the urea water temperature and the urea water concentration.

Further, at the time of abnormality determination of each of the supply valves 21A, 21B, in a case where the degree of compression of the urea water in a period from the start of the filling of the supply passage 23 with the urea water to the output of the valve opening command for each of the supply valves 21A, 21B is small, the determination condition of the sticking abnormality determination may be changed to a side where the determination of the sticking abnormality is less likely to be made than in a case where the degree of compression of the urea water is large. More specifically, as described with reference to FIG. 8, the predetermined period TA, which is a waiting time of the pressure increase after the output of the valve opening command for the supply valve 21, may be variably set based on the valve opening threshold of the supply valve 21.

In the above embodiment, the first catalyst 12A and the second catalyst 12B are arranged in series, but may be arranged in parallel. That is, two exhaust passages 11 from the internal combustion engine 10 may be provided in parallel, and the first catalyst 12A and the second catalyst 12B may be disposed in each of them.

The present invention can also be applied to other than an in-vehicle exhaust gas purification system. For example, the present invention can be applied to an exhaust gas purification system in a moving body other than a vehicle or a stationary exhaust gas purification system.

The control units and methods thereof described in the present disclosure may be implemented by a dedicated computer including a processor programmed to execute one or more functions embodied by a computer program and a memory. Alternatively, the control unit and the method described in the present disclosure may be realized by a dedicated computer provided by configuring a processor with one or more dedicated hardware logic circuits. Alternatively, the controller and the method described in the present disclosure may be implemented by one or more special purpose computer, which is configured as a combination of a processor and a memory, which are programmed to perform one or more functions, and a processor which is configured with one or more hardware logic circuits. A computer program may be stored in a computer-readable non-transitory tangible recording medium as an instruction executed by a computer.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. An exhaust gas purification controller applied to an exhaust gas purification system including a catalyst of a selective reduction type provided in an exhaust passage of an internal combustion engine, a supply valve provided to supply urea water to an upstream part of the catalyst in the exhaust passage, and a pump for pumping the urea water to a supply passage connecting a urea water tank for storing the urea water with the supply valve, the exhaust gas purification controller for performing an abnormality diagnosis of the supply valve, the exhaust gas purification controller configured to:
   drive the pump at a start of operation of the exhaust gas purification system to start filling the supply passage with the urea water;
   output a valve opening command for opening the supply valve when a urea water pressure in the supply passage exceeds a predetermined valve opening pressure after filling the supply passage with the urea water is started;
   determine presence or absence of a sticking abnormality of the supply valve based on the urea water pressure after the output of the valve opening command; and
   determine that the sticking abnormality of the supply valve has occurred when an increase amount of the urea water pressure during a predetermined period from the output of the valve opening command is larger than a predetermined threshold.

2. The exhaust gas purification controller according to claim 1, wherein
   the catalyst includes a first catalyst and a second catalyst, the supply valve includes
      a first supply valve provided to supply the urea water to an upstream part of the first catalyst in the exhaust passage, and
      a second supply valve provided to supply the urea water to an upstream part of the second catalyst in the exhaust passage,
   the exhaust gas purification controller is further configured to:
      perform the sticking abnormality determination of the first supply valve after the valve opening command unit outputs a valve opening command for the first supply valve, and
      perform the sticking abnormality determination of the second supply valve after the first determination unit determines the sticking abnormality of the first supply valve and after the valve opening command unit outputs the valve opening command for the second supply valve.

3. The exhaust gas purification controller according to claim 2, wherein the exhaust gas purification controller is further configured to:
   output a valve closing command for closing the first supply valve when the urea water pressure reaches a predetermined valve closing pressure, which is higher than the valve opening pressure, after the sticking abnormality determination of the first supply valve by the first determination unit, and
   perform the sticking abnormality determination of the second supply valve after the valve closing command unit outputs the valve closing command for the first supply valve and after the valve opening command unit outputs the valve opening command for the second supply valve.

4. The exhaust gas purification controller according to claim 2, wherein
   the exhaust gas purification controller is configured to perform the sticking abnormality determination of the second supply valve in different manners between a case where the exhaust gas purification controller determines that the first supply valve is in a normal state and a case where the exhaust gas purification controller determines that the sticking abnormality of the first supply valve has occurred.

5. The exhaust gas purification controller according to claim 2, wherein
   the exhaust gas purification controller is further configured to acquire, as a pressure increase amount, an increase amount of the urea water pressure during a second predetermined period from the output of the valve opening command for the second supply valve, and determine the presence or absence of the sticking abnormality of the second supply valve based on the pressure increase amount, and
   the exhaust gas purification controller is further configured to set the second predetermined period in a case where the exhaust gas purification controller determines that the first supply valve is in the normal state to be shorter than the second predetermined period in a case where the exhaust gas purification controller determines that the sticking abnormality of the first supply valve occurs in the first supply valve.

6. The exhaust gas purification controller according to claim 2, wherein
   the exhaust gas purification controller is further configured to acquire a pressure increase value indicating an increase in the urea water pressure after the output of the valve opening command for the second supply valve, and determine that the second supply valve is in the normal state on a condition that the pressure increase value is smaller than a predetermined abnormality determination threshold, and
   the exhaust gas purification controller is further configured to set the abnormality determination threshold in a case where the first determination unit determines that the first supply valve is in the normal state to be larger than the abnormality determination threshold in a case where the first determination unit determines that the sticking abnormality has occurred in the first supply valve.

7. The exhaust gas purification controller according to claim 1, further configured to:
   acquire a state parameter indicating a state of the urea water flowing into the supply passage when the pump is driven; and
   set the valve opening pressure, which is an output condition of the valve opening command, based on the state parameter.

8. The exhaust gas purification controller according to claim 1, configured to:
   acquire a state parameter indicating a state of the urea water flowing into the supply passage when the pump is driven; and
   set the predetermined threshold and the predetermined period used in the determination of the sticking abnormality based on the state parameter.

9. The exhaust gas purification controller according to claim 8, wherein the state parameter indicating the state of the urea water is a temperature of the urea water.

10. The exhaust gas purification controller according to claim 8, wherein the state parameter indicating the state of the urea water is a concentration of the urea water.

11. The exhaust gas purification controller according to claim 1, wherein the exhaust gas purification controller is further configured to:
change a determination condition of the sticking abnormality determination performed based on the urea water pressure after the valve opening command is output to a condition in which the sticking abnormality is less likely to be determined, in a case where a degree of urea water compression is small in a period from when the filling of the supply passage with the urea water is started to when the valve opening command for the supply valve is output, compared to a case where the degree of urea water compression is large.

12. The exhaust gas purification controller according to claim 1, wherein
the exhaust gas purification controller is further configured to determine a closed sticking abnormality in which the supply valve is stuck in a closed state and an open sticking abnormality in which the supply valve is stuck in an open state based on a comparison between an increase value of the urea water pressure after the output of the valve opening command and a predetermined abnormality determination threshold, and
the abnormality determination threshold for closed sticking determination is larger than the abnormality determination threshold for open sticking determination.

* * * * *